US008180698B2

(12) United States Patent
Lerner

(10) Patent No.: US 8,180,698 B2
(45) Date of Patent: May 15, 2012

(54) SYSTEM FOR PHYSICALS COMMODITY TRADING

(76) Inventor: Julie A. Lerner, New York, NY (US)

( * ) Notice: Subject to any disclaimer, the term of this patent is extended or adjusted under 35 U.S.C. 154(b) by 2179 days.

(21) Appl. No.: 09/907,450

(22) Filed: Jul. 18, 2001

(65) Prior Publication Data

US 2002/0120555 A1    Aug. 29, 2002

Related U.S. Application Data

(60) Provisional application No. 60/219,023, filed on Jul. 18, 2000.

(51) Int. Cl.
G06Q 40/00 (2006.01)

(52) U.S. Cl. ........... 705/37; 705/36; 705/38; 705/26; 705/400

(58) Field of Classification Search .......... 705/26, 705/36–38, 400
See application file for complete search history.

(56) References Cited

U.S. PATENT DOCUMENTS

| | | | | |
|---|---|---|---|---|
| 4,677,552 A | * | 6/1987 | Sibley, Jr. | 705/37 |
| 5,297,031 A | * | 3/1994 | Gutterman et al. | 705/37 |
| 5,774,878 A | | 6/1998 | Marshall | |
| 5,864,827 A | | 1/1999 | Wilson | |
| 5,873,071 A | * | 2/1999 | Ferstenberg et al. | 705/36 R |
| 6,161,099 A | | 12/2000 | Harrington et al. | |
| 6,278,982 B1 | | 8/2001 | Korhammer et al. | |
| 6,317,727 B1 | * | 11/2001 | May | 705/36 R |
| 6,317,728 B1 | | 11/2001 | Kane | |
| 6,912,510 B1 | * | 6/2005 | Shepherd | 705/37 |
| 7,124,108 B1 | * | 10/2006 | Kimle et al. | 705/37 |
| 2001/0034689 A1 | * | 10/2001 | Heilman, Jr. | 705/37 |
| 2002/0032632 A1 | * | 3/2002 | Sernet | 705/37 |

* cited by examiner

Primary Examiner — Harish T Dass
(74) Attorney, Agent, or Firm — Greenberg Traurig, LLP

(57) ABSTRACT

A method and system for an electronic commodities trading marketplace along with ancillary tools provide an electronic trading center for world market commodity importers, exporters, and the intermediaries and processors between them. This trading center is offered through its website centered around a 24-hour exchange that provides trading markets for commodities such as coffee, sugar, cocoa and cotton. The scalable system provides aggregated third party services linked to both front and back office operations. These services can include items such as live futures quotes and real-time news, futures brokerage, banking and finance links and resources, and a suite of applications tailored to members' specific risk-management and end-to-end contract execution needs. The system also provides access to shipping related services such as freight brokerage, direct booking for liner transport, load and discharge supervision and laboratory testing.

18 Claims, 26 Drawing Sheets

| FIG. 3A | FIG. 3B |

Full Trade Screen

BigDogTrader.com-WORLD/RAW SUGAR — BigDogTrader

File  Edit  View  Ticker Options  Research  Window  Help  TOOLBOX  TRADE!

| Sugar #11-NYBDT | contract | last | high | low | | BDT Calculator | | | Sugar #5-LIFFE | contract | last | high | low | |
|---|---|---|---|---|---|---|---|---|---|---|---|---|---|---|
| | SBN0 | 8.57s | 0.08 | 8.59 | Spread | Premium | | | | SWQ00 | 235.6 | 0.3 | 237 | |
| | SBV0 | 8.44s | -0.01 | 8.54 | ----- | 46.67 | | | | SWZ00 | 232.4 | -1 | 234.5 | ←back |
| | SBH1 | 8.22s | 0.01 | 8.3 | 0.13 | 46.33 | | | | SWV00 | 232.3 | -0.9 | 233.3 | |
| | | | | | 0.22 | 51.08 | | | | | | | | |

| 405A<br>Quantity | B<br>Shipment | C<br>Delivery Point | D<br>Origin | E<br>Dest. | F<br>Quality | G<br>Bid | H<br>Offer | I<br>Deliverable | J<br>Other | K<br>Last Trade |
|---|---|---|---|---|---|---|---|---|---|---|
| SNAP TENDER: CIAMSA 36MMT BULK RAWS: 12MMT EACH H/K15, KN15, NU15 1PM EST SEALED BIDS | | | | | | | | | | |
| SNAP TENDER: CNF EGYPT 14MMT BRS APRL 1-20 ARRVL OPEN RFP DEADLINE 11AM EST | | | | | | | | | | |
| FOB | | | | | | | | | | |
| Under 10000MT | | | | | | | | | | |
| 2350mt +/- 10% | Prompt | El Salvador | X | | BRS | | -28 | | | Gra i 2500mt+/-1pct. |
| 5M-8.5MMT | Prompt | CIF NY | | X | RXP | | PAR | | Tolling Option | |
| 10,000 to 19,000mt | | | | | | | | | | |
| 10500 | F20/G15 | N. Brazil | X | | BRS | -0.8 | -.04 | | Flex 10mmt-12.5mmt | 12mmt SB-11-08. 12 |
| 12000 | H/K15 | Guatemala | X | | BRS | +12 | +15 | SBH1 | S.E.O w/60-40buyback | |
| 14500 | H/K15 | Bangkok/Kos | X | | BRS | 17 | +22 | SBH1 | | 21500mt,+27.11.15.0 |
| 12000 | N/U | South Africa | X | | BRS | +15 | +35 | | | 12mm+32.12.10.00 |
| Over 20,000MT | | | | | | | | | | |
| 22000 | N/U15 | Santos | | | | | -10 | | 98 deg. pct, baged apt. | |
| CIF/CNF | | | | | | | | | | |
| 14000 | H/K15 | Korea | | X | BRS | +$32/mt | | | OPTN CNF JPN or KOR | |
| 18000+/-10% | H/K15 | RBS | | X | BRS | | +$34/mt | | OMNI origin | |
| 22,000-+/-10pct | G15/H | Japan | | X | BRS | | | | OMNI origin | |
| BAGGED | | | | | | | | | | |

My Page | Futures | Physicals | Accounts | Trade Finance | Market Information | Trading Tools | Details & Diversions | Freight & Traffic

FIG. 4B

ENTER MARKET ORDER

| ENTER MARKET ORDER | | | Bid ● Offer ○ |
|---|---|---|---|
| Quality | standard bulk raws ⬍ | | 436 |
| Quantity | 14,000 metric tons | Tolerance | +/-500mt ⬍ |
| Shipment | H/K 15 ⬍ | Flexibility | +/- 2 wks ⬍ |
| Price | ○ Fixed ● Float  ○ $MT  ● 1/100 CTS/LB  ● Premium ○ Discount SBH1 | Tolerance  Other | +10  ○ show  ● hide  +10 for H/K |
| Pricing | against actual ⬍ | Alternative | SEO ⬍ |
| Payment | CAD NY ⬍ | Alternative | Sight LC |
| Delivery Point | Bangkok/Kosichang ⬍  Other _____ | Alternative | None ⬍ |
| | substitute origin with ___ for [increase ⬍] in price of ___ | | |
| Delivery Terms | ● FOB ○ CIF ○ CNF ○ OTHER | | |
| Deliverable | ● YES ○ NO Contract SBH1 | | |
| Validity | ___ Time ● Good until cancelled (GTC)  ○ Good within following market movement:  Contract ___ Floor ___ Ceiling ___ | | ENTER ORDER  CANCEL  CLEAR |

GO TO AUTOTRADE WIZARD

| | | | |
|---|---|---|---|
| □ ≡≡≡Netscape: ≡≡≡ | | | |
| I WISH TO SUBMIT THE FOLLOWING BID INTO THE SYSTEM | | | |
| Bid # | BRS123 | | |
| Quality | bulk world raws | Variance | None |
| Quantity | 14,000mt | Tolerance | +/- 500mt |
| Shipment | H/K 15 | Flexibility | +/- 2 weeks |
| Pricing | Against Actual | Alternative | SEO |
| Payment | CAD NY | Alternative | sight L/C |
| Delivery | FOB Bangkok/Kosi | Flexibility | None |
| Deliverable | SBH1 | Tolerance | 10 points hidden |
| Price | SBH1+12 points | Flexibility | H/K at 10 point premium |
| Validity | GTC | | |

442 — ☐ Manual
☒ Autotrade

SUBMIT | AMEND | CANCEL ← 440

Check only one box below:
☒ This is a new entry into the system

444 — ☐ This cancels my existing entry number____(system automatically enters closest matching offer where identified, but gives member option of new id #)
☐ Please remove my existing entry only for the duration of the above offer

BigDogTrader.com-WORLD RAW SUGAR — BigDogTrader

File  Edit  Layout  View  Ticker  Options  Research  Window  Help  TOOLBOX  TRADE!

| Sugar #11-NYBDT | contract | last | high | low |   | BDT Calculator |   | Sugar #5-LIFFE | contract | last | high | low |
|---|---|---|---|---|---|---|---|---|---|---|---|---|
|   | SBN0 | 8.57s | 0.08 | 8.59 |   |   |   |   | SWQ00 | 235.6 | 0.3 | 237 |
|   | SBV0 | 8.44s | -0.01 | 8.54 |   |   |   |   | SWZ00 | 232.4 | -1 | 234.5 |
|   | SBH1 | 8.22s | 0.01 | 8.3 |   |   |   |   | SWV00 | 232.3 | -0.9 | 233.3 |

SNAP TENDER: CIAMSA 36MMT BULK RAWS; 12MMT EACH H/K15, KN15, NU15 1PM EST SEALED BIDS
SNAP TENDER: CNF EGYPT 14MMT BRS APRL 1-20 ARRVL  OPEN RFP DEADLINE 11AM EST
FOB
Under 10000MT

| Quantity | Shipment | Delivery Point | Origin | Dest. | Quality | Premium | Bid | Offer | Deliverable | Other | Last Trade |
|---|---|---|---|---|---|---|---|---|---|---|---|
| 2350mt +/- 10% | Prompt | El Salvador | X |   | BRS | 46.67 |   | -28 |   |   | Gra1 2500mt+/-1pct. |
| 5M-8.5MMT | Prompt | CIF NY |   | X | RXP | 46.33 |   | PAR |   | Tolling Option |   |
| 10,000 to 19,000mt |   |   |   |   |   |   |   |   |   |   |   |
| 10500 | F20/G15 | N. Brazil | X |   | BRS |   | -0.8 | -.04 |   | Flex 10mmt-12.5mmt | 12mmt SB-11-08. 12 |
| 12000 | H/K15 | Guatemala | X |   | BRS |   | +12 | +15 | SBH1 | S.E.O w/60-40buyback |   |
| 14500 | H/K15 | Bangkok/Kosi | X |   | BRS | 51.08 | 17 | +22 | SBH1 |   | 21500mt, +27.11.15.0 |
| 14000 | H/K15 | Bangkok/Kosi | X |   | BRS |   | +12 | +35 | SBH1 | Flex Terms |   |
| 12000 | N/U | South Africa |   |   | BRS |   | +15 |   |   |   |   |
| Over 20,000MT |   |   |   |   |   |   |   |   |   |   |   |
| 22000 | N/U15 | Santos |   |   | BRS |   |   | -10 |   | 98 deg. pol, baged apt. |   |
| CIF/CNF |   |   |   |   |   |   |   |   |   |   |   |
| 14000 | H/K15 | Korea |   | X | BRS |   | +$32/mt |   |   | OPTN CNF JPN or KOR |   |
| 18000+/-10% | H/K15 | RBS |   | X | BRS |   |   | +$34/mt |   | OMNI origin |   |
| 22,000+/-10pct | G15/H | Japan |   | X | BRS | +$32/mt |   |   |   | OMNI origin |   |
| BAGGED |   |   |   |   |   |   |   |   |   |   |   |

454 (→ pointing to 14000 Bangkok/Kosi row)
452 (→ pointing to CIF/CNF row)

:::: My Page | Futures | Physicals | Accounts | Trade Finance | Market Information | Trading Tools | Details & Diversions | Freight & Traffic

| MARKET ORDER DETAILS | | | |
|---|---|---|---|
| Bid # | BRS123 | | |
| Quality | bulk world raws | Variance | None |
| Quantity | 14,000mt | Tolerance | +/- 500mt |
| Shipment | H/K 15 | Flexibility | +/- 2 weeks |
| Pricing | Against Actual | Alternative | SEO |
| Payment | CAD NY | Alternative | sight L/C |
| Delivery | FOB Bangkok/Kosi | Flexibility | None |
| Deliverable | SBH1 | Required | No |
| Price | SBH1+12 points | Flexibility | H/K at 10 point premium |
| Time Ext. | 10:42 am EST 12.12.00 | | |

— 466

*View Member Profile*    [EXECUTE] [NEGOTIATE] [CANCEL]

Member Profile lists type of membership, ST Ranking, Office location and when established, revenue range memberships/credentials.
Buyer chooses to negotiate, which leads to following screen.

Trade Details Screen

BigDogTrader.com-WORLD RAW SUGAR  BigDogTrader

| File | Layout | Edit | View | Ticker | Options | Research | Window | Help | TOOLBOX | TRADE! | | |

| Sugar #11-NYBDT | contract | last | high | low | | BDT Calculator | | Spread | Premium | Sugar #5-LIFFE | contract | last | high | low |
|---|---|---|---|---|---|---|---|---|---|---|---|---|---|---|
| | SBN0 | 8.57s | 0.08 | 8.59 | | | | ----- | 46.67 | | SWQ00 | 235.6 | 0.3 | 237 |
| | SBV0 | 8.44s | -0.01 | 8.54 | | | | 0.13 | 46.33 | | SWZ00 | 232.4 | -1 | 234.5 |
| | SBH1 | 8.22s | 0.01 | 8.3 | | | | 0.22 | 51.08 | | SWV00 | 232.3 | -0.9 | 233.3 |

↳back  472

BULK RAW SUGAR BID    COUNTER PROPOSAL

| Bid # | BRS123 | | | Bid # | ORS456 | |
|---|---|---|---|---|---|---|
| Quality | bulk world raws | Variance | None | Quality | bulk world raws | Variance | None |
| Quantity | 14,000mt | Tolerance | +/- 500mt | Quantity | 14,500mt | Tolerance | None |
| Shipment | H/K 15 | Flexibility | +/- 2 weeks | Shipment | H/K | Flexibility | None |
| Printing | Against Actual | Alternative | SEO | Printing | Against Actual CAD NY | Alternative | None |
| Payment | CAD NY | Alternative | sight L/C | Payment | CAD NY | Alternative | None |
| Delivery | FOB Bangkok/Kosi | Flexibility | None | Delivery | FOB Bangkok/Kosi | Flexibility | None |
| Deliverable | SBH1 | Required | No | Deliverable | SBH1 | Required | N/A |
| Price | SBH1+12 points | Flexibility | H/K at 10 point premium | Price | SBH1+30 points | | |
| Time Ext. | 10:42 am EST 12.12.00 | | | Validity | 20 minutes | | |

474   470

*View Member Profile*

Right-hand box fills in fields as listed on left. Bidder over-writes fields he'd like to change. When bidder submits counterproposal, the seller immediately receives a notice flashing across his homepage. Validity is not shown. The above counter-proposal is shown to all members within the same screen as follows: (Any time member clicks submit anywhere on site, system asks to confirm)

[SUBMIT] [CLEAR FORM]

| ::: My Page | Futures | Physicals | Accounts | Trade Finance | Market Information | Trading Tools | Details & Diversions | Freight & Traffic |

FIG. 4H

| Netscape: | | | |
|---|---|---|---|
| I WISH TO SUBMIT THE FOLLOWING BID INTO THE SYSTEM ||||
| Bid # | ORS456 | | |
| Quality | bulk world raws | Variance | None |
| Quantity | 14,500mt | Tolerance | +/- 500mt |
| Shipment | H/K 15 | Flexibility | +/- 2 weeks |
| Pricing | Against Actual | Alternative | SEO |
| Payment | CAD NY | Alternative | sight L/C |
| Delivery | FOB Bangkok/Kosi | Flexibility | None |
| Deliverable | SBH1 | | |
| Price | SBH1+30 points | | |
| Validity | GTC | | |

478

☐ Manual
☒ Autotrade

[SUBMIT] [AMEND] [CANCEL]

Check only one box below:

☒ This is a new entry into the system

☐ This cancels my existing entry number____(system automatically enters closest matching offer where identified, but gives member option of new id #)

☐ Please remove my existing entry only for the duration of the above offer

| BigDogTrader.com-WORLD RAW SUGAR | | | | | | | | | | BigDogTrader |
|---|---|---|---|---|---|---|---|---|---|---|
| File | Layout | Edit | View | Ticker | Options | Research | Window | Help | TOOLBOX | TRADE! |

| Sugar #11-NYBDT | contract | last | high | low | Spread | Premium | BDT Calculator | Sugar #5-LIFFE | contract | last | high | low | | |
|---|---|---|---|---|---|---|---|---|---|---|---|---|---|---|
| | SBN0 | 9.57s | 0.08 | 8.59 | ----- | 46.67 | | | SWQ00 | 235.6 | 0.3 | 237 | | back |
| | SBV0 | 8.44s | -0.01 | 8.54 | 0.13 | 46.33 | | | SWZ00 | 232.4 | -1 | 234.5 | | |
| | SBH1 | 8.22s | 0.01 | 8.3 | 0.22 | 51.08 | | | SWV00 | 232.3 | -0.9 | 233.3 | | |

SNAP TENDER: CIAMSA 36MMT BULK RAWS: 12MMT EACH H/K15, KN15, NU15 1PM EST SEALED BIDS
SNAP TENDER: CNF EGYPT 14MMT BRS APRL 1-20 ARRVL OPEN RFP DEADLINE 11AM EST
FOB
Under 10000MT

| Quantity | Shipment | Delivery Point | Origin | Dest. | Quality | Bid | Offer | Deliverable | Other | Last Trade |
|---|---|---|---|---|---|---|---|---|---|---|
| 2350mt +/- 10% | Prompt | El Salvador | X | | BRS | | -28 | | | Gra1 2500mt+/-1pct. |
| 5M-8.5MMT | Prompt | CIF NY | | X | RXP | | PAR | | Tolling Option | |
| 10,000 to 19,000mt | | | | | | | | | | |
| 10500 | F20/G15 | N. Brazil | X | | BRS | -0.8 | -04 | | Flex 10mmt-12.5mmt | 12mmt SB-11-08. 12 |
| 12000 | H/K15 | Guatemala | X | | BRS | +12 | +15 | SBH1 | S.E.O w/60-40buyback | |
| 14500 | H/K15 | Bangkok/Kosi | X | | BRS | 17 | +22 | SBH1 | | 21500mt,+27.11.15.0 |
| 14000 | H/K | Bangkok/Kosi | X | | BRS | | +30 | SBH1 | Flex Terms | |
| 14500 | N/U | South Africa | X | | BRS | +15 | +35 | | | |
| 12000 | | | | | | | | | | |
| Over 20,000MT | | | | | | | | | | |
| 22000 | N/U15 | Santos | X | | BRS | | -10 | | 98 deg. pol, baged ept. | |
| CIF/CNF | | | | | | | | | | |
| 14000 | H/K15 | Korea | | X | BRS | +$32/mt | | | OPTN CNF JPN or KOR | |
| 18000+/-10% | H/K15 | RBS | | X | BRS | | +$34/mt | | OMNI origin | |
| 22,000+/-10pct | G15/H | Japan | | X | BRS | | | | OMNI origin | |

| My Page | Futures | Physicals | Accounts | Trade Finance | Market Information | Trading Tools | Details & Diversions | Freight & Traffic |

Trade Executed

FIG. 4K

BigDogTrader
*Marketplace of the future* www.bigdogtrader.com log in
password
[Go]

| Futures | Physicals | Trade Finance | Market Information | Trading Tools | Freight/Traffic |

500

| Contract | Last |
|---|---|
| SBVO | 1066 |
| CKUO | 7860 |
| CCUO | 7680 |
| CTVO | 6170 |

- New Users
- Accounts
- Bulletin Board
- Calendar
- Contact Us
- View Demo
- Contracts
- The Park

Contracts

Financing request for quotes
- Revolving letters of credit
- Red clause letter of credit
- Structured financing quotes
- 30,-180 day letters of credit

PAYMENT DOCUMENTS

514 Extend Payment or Pre-export finance
- 30,-180 day letters of credit
- Revolving letters of credit
- Red clause letter of credit
- Structured finance- quoted
- New Structured finance biz
- Letter of credit confirmation
- Cash against documents authorization

Sugar 502
- Bulk World Raws (BRS)
- Refined Sugar in Poly/Polyjute Bags (RPI)
- Refined Sugar PP Bags. Opton PI Bags + S2/MT (RPO)
- Bulk Sugar Re-export (RXP)
- Tolling Order: Sell RXP receive RPI (TOL)
- US #14 Quota Raw Sugar(Q

Coffee 504
- Robusta FOB: Ivory, Coast, Indonesia, other
- Arabica FOB: Columbia, Brazil, Central America
- CNF Nola
- CNF Europe: Rotterdam/Hamburg/

Cocoa 508
- FOB Indonesia
- FOB Ivory Coast
- FOB Other Africa
- CNF Amsterdam
- CNF Main East Coast U.S (FDA specs)
- Bulk terms

Cotton 510
- FOB West Coast US
- FOB East Coast US
- CNF/CIF North Continent
- Delivered Plant (Omni-Destination)

My Page

BigDogTrader 506
- Terrier
- Akita
- Boxer
- Ridgeback

Rate Boards 508
- Cash premiums
- Freight Grid

Freight 512
- Coffee CIF Liner
- Time Charter re-ooffer
- Co-freight terms
  - Panamax
  - Top-off

FIG. 5

| FIG. 6(A)-1 |
|---|
| FIG. 6(A)-2 |

FIG. 6(A)

CUSTOM VIEW OF REAL TIME POSITION SHEET
VIEW B MTONS
  LOTS
  DELIVERY PT          600
  TRADER
  REGIONAL OFFICE

GO TO: BOGEY CALC
  ARB WATCHDOG
  OPTIONS PRICER
  CASH TRADE DETAILS & STATUS

DETAILS:
  POSITION ONLY
  ALL DETAILS
  REAL-TIME pnl
  ARB WATCHDOG

RECALC PNL
UPDATE CASH VALS
  MANUAL
  BDT DAILLY AVG
VIEW PRINTABLE VERSION

| Spreeds | Ranks | Settle | Prior settle | Charge |
|---|---|---|---|---|
| | H/K | | | |
| | K/N | | | |
| | N/V | | 602 | |
| | V/H9 | | | |
| | Whites | | | |
| | H/K | (6) | (5) | (1) |
| | K/Q | (3) | (1) | (2) |
| | K/V | (3) | (2) | (1) |
| | Q/V | 3 | 4 | (1) |
| Premiu | ny/liffe | | | |
| | H/H | 39 | 38 | 2 |
| | K/K | 46 | 45 | 2 |
| | Q/N | 56 | 54 | 2 |
| | V/V | 52 | 51 | 1 |
| | 45ic/100ic | | | |
| | H/H | 15 | 15 | 0 |

| | | | | | |
|---|---|---|---|---|---|
| SBV0 | 10.65s | 0.06 | 10.72 | 10.3 | 13:49 |
| SBH1 | 10.28s | 0.12 | 10.37 | 10.1 | 13:43 |
| SBK1 | 10.03s | -0.03 | 10.1 | 9.83 | 13:43 |
| SBN1 | 9.62s | 0.06 | 9.68 | 9.5 | 13:43 |
| SBV1 | 9.44s | 0.06 | 9.44 | 9.33 | 13:43 |
| SBH2 | 9.28s | 0.07 | 9.28 | 9.2 | 13:43 |
| SEX0 | 17.55s | -0.11 | 17.65 | 17.5 | 14:23 |
| SEF1 | 17.60s | -0.1 | | | |
| SWV0 | 271.40s | 3 | 272 | 264 | 13:51 |
| SWZ0 | 269.50s | 28 | 270 | 263 | 13:51 |
| SWH1 | 267.10s | 3.1 | 267.7 | 261 | 13:51 |
| SWK1 | 262.00s | 2.5 | 262 | 262 | 13:51 |
| SWQ1 | 256.80s | 2.8 | 256.8 | 253 | 13:51 |
| SWV1 | 249.60s | 4.4 | 249.6 | 250 | 13:51 |
| SWZ1 | 249.10s | 2.9 | | | |

Pivot Points — 606

| Pivot Points | FROM LAST COB | | | |
|---|---|---|---|---|
| | R2 | R1 | Pivot | S1 | S2 |
| March | 12 | 12 | 12 | 12 | 12 |
| May | | 12 | 12 | 12 | 12 |

CURRENT CASH VALUES    INPUT NEW CLEAR ALL
                 LAST   NEW   CHANGE

RAW    HK FE
        HK WHEMI
        KN FE
        KN WHEMI
        V/Z COLO

WSGR  MAR 4MD
        MAR WHEMI
        MA 4MD
        MAY THAI100

CNF    RBS
        US QTA

608

RAW SUGAR — 610

| No. 11 | Tokyo | Swaps | Far East Cash | W. Hem Cash | Sub Total | YTD ACTUAL | YTD TARGET | NET |
|---|---|---|---|---|---|---|---|---|
| | | | | 37175 | 37175 | | | |
| | | | | (2800) | (2800) | | | |
| | | | | 5371 | 5371 | | | |
| (40234) | | | 25400 | 12000 | 32000 | 29166 | | |
| (38354) | | | | | 0 | | | |
| | | | | (38354) | (38354) | | | |
| (610) | | | | | 0 | | | |
| | | | | (610) | (610) | | | |
| | | | | 0 | 0 | | | |
| | | | | (61316) | (61316) | | | |
| 35763 | | | | 14000 | 14000 | | | |
| | | | | 35763 | 35763 | | | |
| (104750) | 0 | 25400 | 12000 | 18396 | 18396 | 39296 | | |

CASH AND FUTURES

WHITE SUGAR

| Month | No.5 | 100-180 Icumsa Swaps | Far Eas Cash | W. He Cash | Sub Total | REALTIM PNL | PREV COB | Change |
|---|---|---|---|---|---|---|---|---|
| Dec | | | | 0 | 0 | 0 | | |
| Jan | | | | 0 | 0 | 0 | | |
| Feb | | | | 0 | 0 | 0 | | |
| Mar | 55900 | 21750 | ##### | 0 | 52650 | 0 | | |
| Apr | ##### | 7500 | | 0 | ##### | 0 | | |
| May | | | | 0 | 0 | 0 | | |
| June | | | | 0 | 0 | 0 | | |
| July | | | | 0 | 0 | 0 | | |
| Aug | 61600 | | | 0 | 61600 | 0 | | |
| Sep | | | | 0 | 0 | 0 | | |
| Oct | ##### | | | 0 | ##### | 0 | | |
| Dec | ##### | | | 1400 | ##### | 0 | | |
| Mar | 0 | | | 0 | 0 | 0 | | |
| Total | | | | 1400 | 20900 | | | |

| OPTIONS | | | | | | | | | | | |
|---|---|---|---|---|---|---|---|---|---|---|---|
| LIFFE | | | | | | NYBOT | | | | | |
| | Type | Month | Strike | Lots | Delta | Tonnage | Type | Month | Strike | Lots | Delta | Tonnage |
| CALLS | OTC | March | 300 | 300 | 1 | 9000 | NYBOT | Feb | | 120 | 0 | 732 |
| | OTC | March | 330 | (200) | 0 | (100) | OTC | H/K | | (280) | 0 | 0 |
| | OTC | March | 340 | 200 | 0 | 0 | NYBOT | March | | 323 | 0 | 7712 |
| | LCE | Aug | 330 | 275 | 0 | 3025 | NYBOT | March | | 450 | 0 | 5715 |
| | OTC | Q/V | 10 | 280 | 0 | 0 | NYBOT | May | | (20) | 0 | (30) |
| | OTC | Q/N W | 60 | 200 | 0 | 0 | NYBOT | May | | 100 | 0 | 1524 |
| | | | | | | | NYBOT | July | | (100) | 0 | (406) |
| | | | | | | | | Subtotal | | 593 | | 15247 |
| | | Subtotal | | | | 11925 | | | | | | |
| | | | | | | 0 | NYBOT | March | | (100) | 0 | 0 |
| PUTS | | | | | | 0 | NYBOT | March | | (225) | 0 | 0 |
| | | | | 612 | | 0 | NYBOT | March | | (350) | 0 | 1778 |
| | | | | | | 0 | NYBOT | March | | (200) | 0 | 2845 |
| | | | | | | 0 | NYBOT | May | | (75) | 0 | 305 |
| | | | | | | | NYBOT | May | | (25) | 0 | 229 |
| | | | | | | | NYBOT | Jul | | (75) | 0 | 1143 |
| | | | | | | | NYBOT | Jul | | (90) | 0 | 2012 |
| | | | | | | | NYBOT | Oct | | (50) | 0 | 787 |
| | | Subtotal | | | | | | Subtotal | | (1190) | | 9099 |
| TOTAL | | | | | | 11925 | | | | | | 21196 |

*CLEARING*
WHITE SUGAR   VIEW BLOTS

| | No. 5 | 100 lcu Far Eas | Schedu Whemi | Schedu AA | Far Eas | W.Hem AA | Total |
|---|---|---|---|---|---|---|---|
| Mar | 1118 | 435 | | | | | (531) |
| May | (1456) | 150 | | | | | (280) |
| Aug | 1247 | | | | | | 683 |
| Oct | (531) | | | | | | 0 |
| Dec | 0 | | | (280) | | | 0 |
| Total | 378 | 585 | 0 | (280) | 0 | 0 | 0 |

RAW SUGAR CLEARING

| | No. 11 | Tokyo | chedu Far Eas | chedul Whemi | Far Eas AA | W.Hem AA | Total |
|---|---|---|---|---|---|---|---|
| Mar | 799 | | (2510) | (236) | 1155 | | (792) |
| May | (755) | | | | | | (755) |
| Aug | (12) | | | | | | (12) |
| Oct | (1207) | | | | | | (1207) |
| Dec | 980 | | (276) | | | | 704 |
| Total | (195) | 0 | 0 | (2786) | 0 | 0 | (2062) |

CLEARING  VIEW B BROKER

| Sugar#11 | MAR | MAY | JUL | OCT | MAR2 |
|---|---|---|---|---|---|
| Fimat | 0 | | | | 0 |
| Phibro | 799 | -755 | -12 | -1207 | 980 |
| Total | 799 | -755 | -12 | -1207 | 980 |

| Sugar #5 | MAR | MAY | AUG | OCT |
|---|---|---|---|---|
| Fimat | 1165 | -1275 | 1058 | -442 |
| Refco | 0 | | 141 | -65 |
| PFL | -47 | -181 | 48 | -24 |
| Total | 1118 | -1456 | 1247 | -531 |

| Sugar #14 | MAR | MAY | JULY |
|---|---|---|---|
| LCL5 | 0 | -20 | |
| PFL | | | |
| Refco | 0 | -10 | -15 |
| Total | 0 | -30 | -15 |

DROP-DOWN MENUE FOR STANDARD WORLD SUGAR ORDER:
ENTER MARKET ORDER  option for fast order or detailed as follows:

| Quality | | |
|---|---|---|
| BRS | WORLD BULK RAWS | |
| RPH | REFINED SUGAR IN POLY / POLYJUTE BAGS | |
| RPO | REFINED SUGAR PP BAGS, OPTION PJ BAGS + $2/MT | |
| RXP | BULK SUGAR FOR RE-EXPORT | |
| TOL | TOLLING ORDER: SELL RXP RECEIVE RPJ | |
| QTA | US #14 QUOTA RAW SUGAR | |
| 100 IC | STANDARD SPECIFICATIONS FOR WHITE SUGAR FROM 45-100 ICUMSA | |
| 150 IC | STANDARD SPECIFICATIONS FOR WHITE SUGAR FROM 100-150 ICUMSA | |
| 180-200 IC | STANDARD SPECIFICATIONS FOR WHITE SUGAR FROM 180-200 ICUMSA | |
| SLF | SULFITADA: 250 ICUMSA | |
| OTHER: | | |

Quantity:  TOPOFF____  ENTER TONNAGE        TOLERANCE:   +/- 5%
           5000 MT                                       +/- 10%
           10000 MT                                      +/- 500 MT
           12000 MT                                      NONE
           14000 MT                                      NEGOTIABLE
           18000 MT                                                    700
           22000 MT
           OTHER____

LT SCHEDULE
SHIPMENT ____ OF ____    ____ TTL QUANTITY
         ____ TRADE AS ONE ORDER  (AUTOTRADE INSERTS COUNTER AS EACH ORDER ENTERED)
         ____ NEGOTIATE AND TRADE AS ONE ORDER      ____ ONE AVERAGE PRICE
         ____ NEGOTIATE AND TRADE SEGMENTS
         ____ SAME PRICE    ____ % PREMIUM FOR EACH SEGM   ____ LIST SEPARATELY       702

SHIPMENT PERIOD:
    PROMPT
    March/May 15'01
    May/July 15'01
    July/Sept 15
    Oct/Dec
    Jan/Mar
    March/May 15'02
    May/July 15'02
    Other:____
    SERIES Key
DP DELIVERY POINT OR FOB/CIF
PM PRICING MECHANISM
SP SHIPMENT PERIOD
QL QUALITY
QT QUANTITY/SERIES
TS TIME STAMP
PY PAYMENT SAMPLE FIELDS
AS TRADED IN THE 2nd HAND Mkt.
LIST TO BE REVISED ON CONTINUAL BASIS
BY DEFAULT, FIELDS ON INITIAL ORDER
SET FOR NO VARIANCE/TOLERENCE
SEE DEMO PAGES FOR ILLUSTRATION

DELIVERY POINT
Bangkok?Kosichang
Santos
FMD (4 main European ports and dutch)
Immingham
Australia
India
Guatemala
Colombia*US NIOLA/East Coast
S. Africa
Morocco
Red/Black Sea
Mediterranean
S. China/Korea
Japan TOLERANCE:
___ SAME PRICE
___ LINKED TO PRICE
ORIGIN/DESITNATION RESTRICTIONS: _____

Delivery Terms:
___ FOB ___ CIF ___ CNF ___ OTHER
___ convert to cnf/fob using listed price +/-$ ____ per Metric Ton PRICE
FIXED _____ $/MT OR cts/LB
FIXED PRICE _____ FUTURES CONTRAC ___ CTS/LB ___ $/MT check one
FIXED AGAINST FUTURES ___ BASIS _____ CTS/LB ___ $/MT check one
___ FUTURES CONTRAC ___ PREMIUM ___ DISCOUNT FLOATING PRICE: _____ FUTURES CONTRACT
BASIS _____ CTS/LB ___ $/MT check one
___ PREMIUM ___ DISCOUNT PRICING MECHANISM
___ Against Actuals
___ Buyer Executable O ___ 60/40 repricing option
___ Seller Executable Or ___ 60/40 repricing option
___ Any of the above per fixed against futures value Payment: ___ CAD NY ___ Financed Transaction   Revolving L/C   check one
___ Sight Letter of Credit                      90day L/C
                                                Pre-Financing
Performance Bond? ___ yes ___ no ___ negotiable  90 credit
Performance Bond? ___ yes ___ no ___ negotiable DP DELIVERY POINT OR FOB/CIF
PM PRICING MECHANISM
SP SHIPMENT PERIOD
QL QUALITY
QT QUANTITY/SERIES

704

TOLERANCE: _____ CTS/LB _____ $/MT check one
VARIABLE: DP ____   DESCRIBE:
                   IF _____ THEN _____
                   IF _____ THEN _____
          PM ____ IF _____ THEN _____
                   IF _____ THEN _____
          SP ____ IF _____ THEN _____
                   IF _____ THEN _____
          QL ____ IF _____ THEN _____
                   IF _____ THEN _____
                   ___ SHOW ___ HIDE

ADD PRICE VARIABLE _____

704

___ SUBMIT THIS ORDER FOR
STRUCTURED FINANCE
(PRE-TRADE/OFF-BOOK FINANCING)

Validity: ___ time
___ Good until cancelled
___ Good for day (COB)
___ Good within following market movement
___ Contract ___ Floor ___ Ceiling                                      706

Authorized access: _____ BDT Account number _____ Include in list Substitute ___

___ Default settings
To alter order:   Colleague name: _____

Notify if traded :
___ Enable wireless acces ___ Disable wireless access
___ Notify me by pager for all activity ___ notify me only if trades ADDITIONAL PRICE/VALIDITY PARAMETERS:   (FUNCTIONALITY OVERLAPS WITH ARBITRAGE WATCHDOG)
* customer selection                     FIXED                                                        708

SCALE PRICE LEVEL      ACTION      INCREMENT  PCTGE              THEN:
Begin: After 1 Hour*   Scale u     ___        ___       Ceiling  ___ Hold
                       Scale d     ___        ___       Floor    ___ Remove AMEND BASED ON BDT ACTIVITY       INSTIGATING ACTION                                    THEN:
Begin: Immediately                ___ SIMILAR MARKET TRADE                              ___ REMOVE ORDER
                                  ___ RANK SIMILARITY IN ORDER: ___ QL ___ SP ___ DP    ___ CHANGE SHIPMENT TO
                                  ___ BIDS BELOW MY CURRENT OFFER BUT ABOVE ___         ___ CHANGE ORIGIN TO:
                                  ___ OFFERS ABOVE MY CURRENT OFFER BUT BELOW ___       ___ CHANGE PRICE TO:
                                                                                        ___ AMEND TO REFLECT HIDDEN PARAMETERS
                                                                                        ___ BEGIN SCALE PRICING AS DEFINED ABOVE
                                                                                        ___ REPLACE ORDER WITH TICKETY NUMBER___
AMEND BASED ON FUTURES ACTIVITY                                                         ___ REMOVE/FREEZE ALL
Begin: On market close    CONTRACT:  OUTRIGHT  SPREAD   TOTAL  Px'd only   OPTION:
       LEVEL 1                       ___       ___      ___    ___         ___
       LEVEL 2                       ___       ___      ___    ___         ___

OTHER:    ACTION                                                                        THEN:
POSITION  IF GROUP'S WORLD RAWS POSITION EXEEDS _____                               ___ REMOVE ORDER
          IF My total position reaches _____                                        ___ BEGIN SCALE PRICING AS DEFINED ABOVE
          Other:                                                                        ___ REPLACE ORDER WITH TICKETY NUMBER___
                                                                                        ___ REMOVE/FREEZE ALL
                                                                                        ___ AMEND TO REFLECT HIDDEN PARAMETERS
                                                                                        ___ CHANGE PRICE TO:

FIG. 7C example using new (unsaved) transaction type.
after trade confirmation alert, member asked if want to set up bogey calc.
if member chooses yes, following screen appears, with some fields automatically inputted based on trade details COUNTERPARTY
    TRADER         ADDRESS:
    BACKOFFICE
    EMAIL          *FIELDS IN BLUE ITALIC ARE FOR FRIEGHT FORWARDING*
    PHONE
    FAX
QUANTITY
QUALITY
SHIPMENT POSITION         *NOMINATE VELLES BY.*
DELIVERY     ESTABLISH ARB WIZARD TO SET PRICING REMINDERS AND LIMITS (CLICK HERE)
PRICE                   *SETTLEMENT DATE:*
PAYMENT
COSTS & DETAILS
    ___FREIGHT                OBTAIN BY:
    ___SUPERVISION   ___STANDARD ___OTHE x$/MT SGS x$/MT ABC___OTHER
    ___HEDGING/PRICING:       ___NONE/PASS THRU__STANDARD PER R.T.__+15PCT FOR REPRICING OPTION
    ___VESSEL AGENT   ___STANDARD __OTHER
    ___SHRINK        ___STANDARD BULK __STANDARD BAG __OTHER
    ___LAB TESTING   ___STANDARD ___OTHER
    ___DOCUMENT HANDLING     DOCUMENT TRACKING DETAILS(Click here)
    ___PAYMENT
        BANK                 COST                 OPEN/RECEIVE DOCS BY:
        ___ NOT YET SELECTED   ___ STANDARD L/C
        ___ ANY NEW YORK      ___ STANDARD CAD
        ___ CHASE               ___ OTHER
        ___ ABN AMRO          ___ REDCLAUSE L/C
        ___ RABOBANK          ___ CONFIRMATION
        ___ *DATA TO REMIND ME TO*   ___ PERFORMANCE BOND
___ INTEREST ___INTEREST RATE
    STANDARD FOB OMNI
    STANDARD FOB THAI
    STANDARD FOB BRAZIL
    STANDARD CNF OMNI (45 DAYS)
    STANDARD CNF RBS
    30DAY FINANCING
    90 DAY FINANCING
    OTHER FINANCING
___ POLITICAL RISK INSURANCE
___ BDT COMMISSION     ___N/A *open policy by_____ documents received: close policy: claims outstanding:*
___ OTHER                   *request authorization to pay*
    TOTAL     RECALC NOW     ADD CONTACT INFO TO MY     SAVE BOGEY AS:
                                ___PALM                 CLOSE AND SAVE
                                ___OUTLOOK
                                ___CUSTOM FIELD
                                ___MAILING LIST

YTD BUDGETED
ACTUAL_____CHANGE
| | |

COUNTERPARTY
QUANTITY
QUALITY
SHIPMENT POSITION
DELIVERY
PRICE
PAYMENT
COSTS & DETAILS
    FREIGHT            PAYMENT
    SUPERVISION     NTEREST
    HEDGING/PRICING  POLITICAL RISK INSURANCE
    VESSEL AGENT    BDT COMMISSION
    LAB TESTING      DEMURRAGE
    DOCUMENT HANDLING DESPATCH
                          OTHER
STATUS: CLOSED AND SETTLED
       PENDING
       UN-SHIPPED
       REMIND ME TO CHECK ON____

FILE DETAILS WHEN OPENED AT LATER DATE APPEAR AS SHOWN ON LEFT

FIG. 9

"SCHEDULER"

COMPONENTS OF EXPORT WIZARD

| | TOTAL DOMESTIC QUALITY | TOTAL EXPORT QUALITY GRADE 1 | TOTAL EXPORT QUALITY GRADE 2 | TOTAL EXPORT QUALITY GRADE 3 | POTENTIA YTD PROFIT | ACTUAL |
|---|---|---|---|---|---|---|

<collapsible fields for delivery positions which correlate to futures market – h,k,n,v,etc.

TOTAL PRODUCTION
    CURRENT OBLIGATIONS IN TONS:
        AVERAGE PRICE
        AVERAGE CASH PREMIUM
    MAX CROP YEAR OBLIGATIONS
    MINIMUM CROP YEAR OBLIGATIONS
        MINIMUM PRICE
        MIN CASH PREMIUM
        EXPECTED CASH PREMIUM
    US QUOTA
    MINIMUM LEVEL STOCKS
    MAXIMUM LEVEL STOCKS
FIRST FULL DAY MILL OPERATIONS
DAILY GRINDING CAPACITY
WAREHOUSING CAPACITY
WAREHOUSING COSTS (DOUBLE-HANDLING, SHRINK, ETC)
INTEREST RATES
OVERTIME COSTS

<u>COST PER TON</u>
<u>COST TO CONVERT TO EXPORT QUALITY</u>    GRADE 1
                                                     GRADE 2
                                                     GRADE 3
NUMBER OF DAYS TO CONVERT QUALITY

<u>CALCULATE NOW</u>      — USE BDT CASH AND FUTURES INPUT
                                        — EDIT BDT, USE OWN VALUES
                                        —CALC USING SENSITIVITY ANALYSIS AT___%
                                               ABOVE AND BELOW ESTABLISHED CASH & FUTS VALUES

<u>COMPARE WITH WIZWORKSHEET #(OPENS SAVES VERSIONS)</u>

<u>PRINT</u>

<u>SAVE AND CLOSE</u>

FIG. 10

Calendar www.bigdogtrader.com log in: [ ]
password: [ ] [Go]

BigDogTrader
*Marketplace of the future*

| Futures | Physicals | Trade Finance | Market Information | Trading Tools | Freight/Traffic |

| Contract | Last |
|---|---|
| KCN0 | 8710 |
| CCN0 | 852 |
| SBN0 | 863 |
| Jul'00 | 56.64 |

- New Users
- Accounts
- Bullentin Board
- Calendar
- Contact Us
- View Demo
- Contracts
- The Park

JUNE 2000

| Monday | Tuesday | Wednesday | Thursday | Friday |
|---|---|---|---|---|
| | | | 1 NY SUGAR #14 First Trading Day SEX1<br><br>NY SUGAR #11 First Trading Day SBQ0 OPTIONS<br><br>NY COCOA: NY first Trading Day CC02 | 2 USDA Sugar Crop Report issued<br>ICCO Cocoa Meeting<br><br>LIFFE<br>NY COCOA: Last trading Day CON0 |
| 5. CMAA board meeting<br><br>•Last Trading Day July '00 Cocoa Options<br><br>BDT Streamline Committee Meeting; deadline to Submit alternatives & new applications for 6.22.00 | 6 NYBOT Commitment of Traders released | 7 •Live forum 2 pm EST G.Nygaard, Octagon Finance "How to Leverage Risk Through Structured Finance" | 8 NY SUGAR #14 Last Trading Day SEN0 | 9 •WASDE releases new estimates<br><br>*NY ROBUSTA: LTD KON0<br><br>*NY SUGAR #14: LTD SON0 |
| 12 *NY ROBUSTA: First Trading Day KON1<br><br>*NY SUGAR: First Trading Day SOV1<br><br>CRB Feb '01 First Trading Day | 13 •ACPC meeting Costa Rica | 14 | 15 *Live forum 2pm Bob Banker VP Bankonline, Inc. "How to cut costs and stream-line operations throught online transactions"<br><br>GCA Warehouse stocks released | 16 |
| 19 *NY ROBUSTA:KON1 | 20 *NY ROBUSTA:KON1 | 21 *NY ROBUSTA:KON0 EXPIRES | 22 *NY ROBUSTA: First Notice Day KON0 | 23 |

My Page   118 East Street, Suite 16F, New York, New York 10022   Phone: 212.643.7577 • Fax: 646.924.6937 • info@bigdogtrader.com

FIG. 11

SYSTEM FOR PHYSICALS COMMODITY TRADING

RELATED APPLICATIONS

The present application claims priority to and incorporates by reference in its entirety the U.S. Provisional Patent Application 60,219,023 filed Jul. 18, 2000.

FIELD OF THE INVENTION

The present invention relates to trading physicals commodities and more particularly to an electronic market place for trading physicals commodities.

BACKGROUND OF THE INVENTION

The following definitions and descriptions help explain the commodities trading industry and some of the misconceptions that exist regarding it. A more complete list of definitions is included as an appendix herein.

MARKETS:

Cash (physicals): Refers to the physical exchange of commodities, either directly with importers, exporters, and processors or between two intermediaries. Jane is a cash trader.

Paper: A regulated exchange to trade futures and options contracts. Futures represent a specific quality, quantity, and standard delivery and performance terms. Options are contracts which offer the right to buy or sell the underlying futures contract. Paper traders take ownership of the physical product, but will always liquidate their position in contract before it expires, thereby avoiding taking possession of the underlying commodity. Dick is a paper trader.

KEY TERMS:

FOB (Free on Board): Seller relinquishes title to goods at origin once it crosses the rail of the loading vessel.

CNF (Cost and Freight): Seller transfers title to the buyer at the destination port.

CIF (Cost, Insurance & Freight): Seller pays for all shipping costs and cargo insurance.

Liquidity: Volume of bids and offers in both cash and futures markets. Higher liquidity yields more trading opportunity and less risk associated with completing (or reversing) a position—Critical for traders without the ability to store and ship the physical commodity.

Transparency: The amount of information readily available to accurately reflect current market prices.

Clearing: Intermediary's performance guarantee to buyer and seller. The intermediary is responsible for all replacement costs if either counterpart defaults.

Clearinghouse: Guarantor of customers' performance, daily reconciliation of each futures and options contract traded on behalf of clients, and net affect on subsequent margin positions (percentage gain or loss versus settlement price required as deposit.

CASH MARKETS PLAYERS:

The trade: International conglomerates who intermediate between commodity exporters and importers. The brochure for the trade house Jane works states that they facilitate the flow of worldwide commodities by assuming and managing distribution risks. It's not that glamorous.

Cash Broker: Matches buyers and sellers of physical commodities. A cash broker does not take title to the goods and often acts as an over-the-counter futures broker as well. Mostly focuses on the active second-hand market between trade houses, who juggle "inventory" around the globe, trying to purchase and deliver the cargo from the least expensive source.

PAPER MARKETS PLAYERS:

Locals: A clearing member (or its employee) of the futures exchange who executes customer orders (open-outcry market) and usually trade for their own account.

Paper traders: Institutions, individuals and hedge fund managers who seek profits by trading futures with no intention of holding contracts until expiration, thereby avoiding the physical receipt or delivery of the physical product. Many are on Wall Street, but Dick works in Midtown.

Many people assume that the physicals ("cash") are to futures markets ("paper") what stock brokers are to NYSE, yet futures were created to hedge the delivery price of commodities in which they anticipated buying or selling at a future date (the end of the harvest). Although investment activity comprises the majority of futures volume today, exchange traded contracts are the root of all world market prices and still the primary source of price protection for world trade participants. The following scenario help differentiate between the two and describes a particular situation that can benefit from the present invention.

Jane is a cash trader; Dick is a paper trader. Jane buys sugar from the farmer today at a fixed price. Since she won't receive it until later, she sells futures for the same quantity to guarantee a minimum price. Dick sold futures to Jane and others since he thinks prices are going down.

Commodity trading is risky—for dick and jane—users of the present inventive systems and methods. These systems and methods can, but do not necessarily, provide clearing services as the custom of the trade does not require such for cash transactions.

One day, Jane buys a cargo of Brazilian sugar with no particular destination in mind. She immediately sells futures for price protection (hedging) even though she's feeling lucky and bullish.

Jane is very happy. Only a week after buying the sugar, she sells it with a big, fat premium. She liquidates her hedge and loses money buying the futures back, but still has the big, fat, premium leftover. If she had been wrong about the market, she would have held the futures until expiry and delivered the sugar to a buyer on the exchange. In this worse case scenario, she limits her losses to the cash premium she paid to the Brazilian mill.

Jane loves her job, especially when she's right. Dick thinks it's a silly waste of time. He couldn't be bothered to charter a vessel, worry whether the boat would sink or if the customer on the other half of the globe decides not to pay. Instead, he just takes twice as much of his bank's money, sits in front of a screen with two phones and his charts, and makes just as much profit as Jane.

In paper trading, the trader must formulate and implement strategies in futures and options markets to compliment hedging and management of physical positions. This involves short and long term analysis of fundamental, technical, political and economic factors. To perform the risk management and operations responsibilities, position limits, margins, profitability, risk/reward of physicals and futures options, counter party risk, country risk, all must be monitored. While in cash trading, the trader must tailor short and log term contracts to meet price risk, payment and scheduling concerns of the counter party within a trade house's profitability objectives. This requires intensive travel to maintain an in-depth knowledge of customers, political and cultural climates, vertical growth opportunities, and risk management issues.

In the past, on-line or electronic exchanges have been developed for specific environments. However, these exchanges are limited to the interaction and involvement between two parties and in may cases have been nothing more than matching software to determine the coincidence of different bids and offers. Until now, such exchanges have not provided a comprehensive marketplace open to multiple types of parties, each having different needs and purposes for being there, nor have they provided an aggregation of services, software, participants and information necessary to change the way trading is performed.

One area in commodities that has seen some experimentation into on-line exchanges is that of energy. However, in addition to the differences stated above, energy differs from soft commodities and the agri-market for a number of fundamental reasons such as the number, size and influence of market participants, the rigidity of standard contracts, profit margins, volatility and the measure and practice of risk management.

SUMMARY OF THE INVENTION

The present inventive system and methods provides a real-time electronic marketplace for physical soft commodities, such as coffee, sugar, cotton, cocoa, rice, etc. Unlike other online trading commodity sites which emulate current offline business practices, the present invention capitalizes on web-enabled technology to provide end-to-end market players with tools to increase profitability and operating efficiencies. to accomplish this, the system facilitates and streamlines the hedging and trade execution process—thereby increasing liquidity in these commodity markets, attracting new market players, and creating new opportunities for all participants. The present invention is not limited the specific global, tight-knot trading communities previously mentioned, but is expandable both horizontally into new markets and vertically into ancillary product offerings such.

Physical soft commodity trading practices have evolved little since World War II, mostly affected by telecommunication advancements and global trend towards privatization. However, by utilizing the Internet's unique ability to break down the barriers of access to information, transparency, geography and time the present systems and methods can minimize the current inefficiencies in commodities trading. By streamlining front-to back-office, operating costs are significantly cut all players in the market. For example, for many producers and end-users in a high-margin niche market such as sugar, the present systems and methods provide, for the first time, an opportunity to bypass middlemen and receive real-time market information. Moreover, by aggregating the marketplaces and ancillary services, the system offers end-to-end transactions at prices substantially lower than present rates.

In one embodiment, the present inventive system is located at a web site that provides a 24-hour marketplace for physical soft commodities supported by a staff of seasoned traders. The present system can but does not necessarily, provide clearing services, as current market customs do not require physical brokers to do so. The system obtains two main sources of revenue: subscription fees for marketplace participants and commissions earned on trades facilitated by bigdogtrader.com.

In a preferred embodiment, the present system employs web site with appropriate design to allow the trading dynamics to be similar to present electronic marketplaces for chemicals and other commodities, yet incorporates additional features that optimize the transparency, anonymity, and liquidity offered by electronic marketplaces. For example, the system permits real-time posting of counterproposals viewable by all market players, thus eliminating closed negotiations and allowing any other eligible member to execute the original order or its counterproposal. Further, the system cultivates twenty-four hour activity by incorporating intelligent default technology to enhance automatic trade execution. These user-friendly parameters will allow customers' to define their flexibility to accept counter-proposals with different prices, quality, and/or delivery period, etc. Finally, a suite of software applications are tailored for all types of users ranging from exporter and processor pricing and scheduling tools, to an Arbitrage Watchdog™ that notifies traders of real-time options or spread opportunities based on pre-defined goals. On operation, many of these applications cull real-time positions in both futures and physicals stored on the system.

As described more fully below, the present inventive systems and methods provide at least the following features:

A twenty-four hour commodity marketplace providing physical trading and essential trading tools: live quote and data feeds, futures brokerage, banking services, and other features for end-to-end trading such as financing and freight.

An industry-wide approach toward development that appeals to all types of market participants rather than today's largest players. Competitive pricing, open access for known and established participants and a user-friendly interface to attract direct business from source and sink customers.

Capitalize on the technological advantages of electronic trading to enhance market efficiency and increase transparency.

Market open to all players who meet credit standards.

Anonymous interaction.

Open and posted negotiations, hidden validity of orders to promote higher trade turnover.

On-line services compound customers' operating efficiency given increased transparency of online marketplaces: facilitate, expedite, and increase financing alternatives for all players, either on or off-book through the company's banking alliance or structured finance (capital markets) alliance. Similar alliances and opportunities are provide with respect to ocean freight.

User-friendly technology to allow customers to define their flexibility of market orders and encourage around-the-clock, fully automated trading (compared with most online sites today which still require manual/oral interaction to confirm a trade.) For example, the system allows orders that offer a specific delivery period and price, yet accept a bid with a wider delivery period if price is at least a certain level.

Aggregated ancillary services allowing members to streamline front-to-back-office procedures with unparalleled savings opportunities.

Standard trade documentation, procedures and development of industries' XML codes.

Unique ability to provide speculators and capital market/structured finance players with real-time fundamental news.

Increased access for all industry participants to increase liquidity of futures markets which in turn propels physical trade volume.

Scalability to expand the system to adapt to almost all physical commodity markets, including present "franchise" strategy for regional markets and increasing supplementary services.

Additional objects, advantages, and novel features of the present invention will be set forth in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A-4K illustrate a series of screen shots depicting a exemplary trade execution.

FIG. 5 illustrates a Forms Wizard in accordance with an embodiment of the present invention.

FIGS. 6A and 6B illustrate a Profit and Loss (PNL) Wizard in accordance with an embodiment of the present invention.

FIGS. 7A, 7B and 7C illustrate an AutoTrade Wizard in accordance with an embodiment of the present invention.

FIG. 9 illustrates an

FIG. 10 illustrates an

FIG. 11 illustrates a Calendar in accordance with an embodiment of the present invention.

DESCRIPTION OF THE PREFERRED EMBODIMENT

A method and system for an electronic commodities trading marketplace along with ancillary tools are described herein. In the following description, for purposes of explanation, numerous specific details are set forth in order to provide a thorough understanding of the present invention. It will be apparent, however, to one of ordinary skill in the art that the present invention may be practiced without these specific details. In other instances, well-known structures and devices are shown in block diagram form in order to avoid unnecessarily obscuring the present invention.

The present systems and methods provide an electronic trading center for world market commodity importers, exporters, and the intermediaries and processors between them. This trading center is offered through its website centered around a 24-hour exchange that provides trading markets for commodities such as coffee, sugar, cocoa and cotton. The scalable system provides aggregated third party services linked to both front and back office operations. These services can include items such as live futures quotes and real-time news, futures brokerage, banking and finance links and resources, and a suite of applications tailored to members' specific risk-management and end-to-end contract execution needs. The system also provides access to shipping related services such as freight brokerage, direct booking for liner transport, load and discharge supervision and laboratory testing.

One alternative implementation includes providing the inventive systems and methods in an Application Service Provider (ASP) model to allow stand-alone entities to establish specific trading markets.

Hardware Overview

Figure 1:
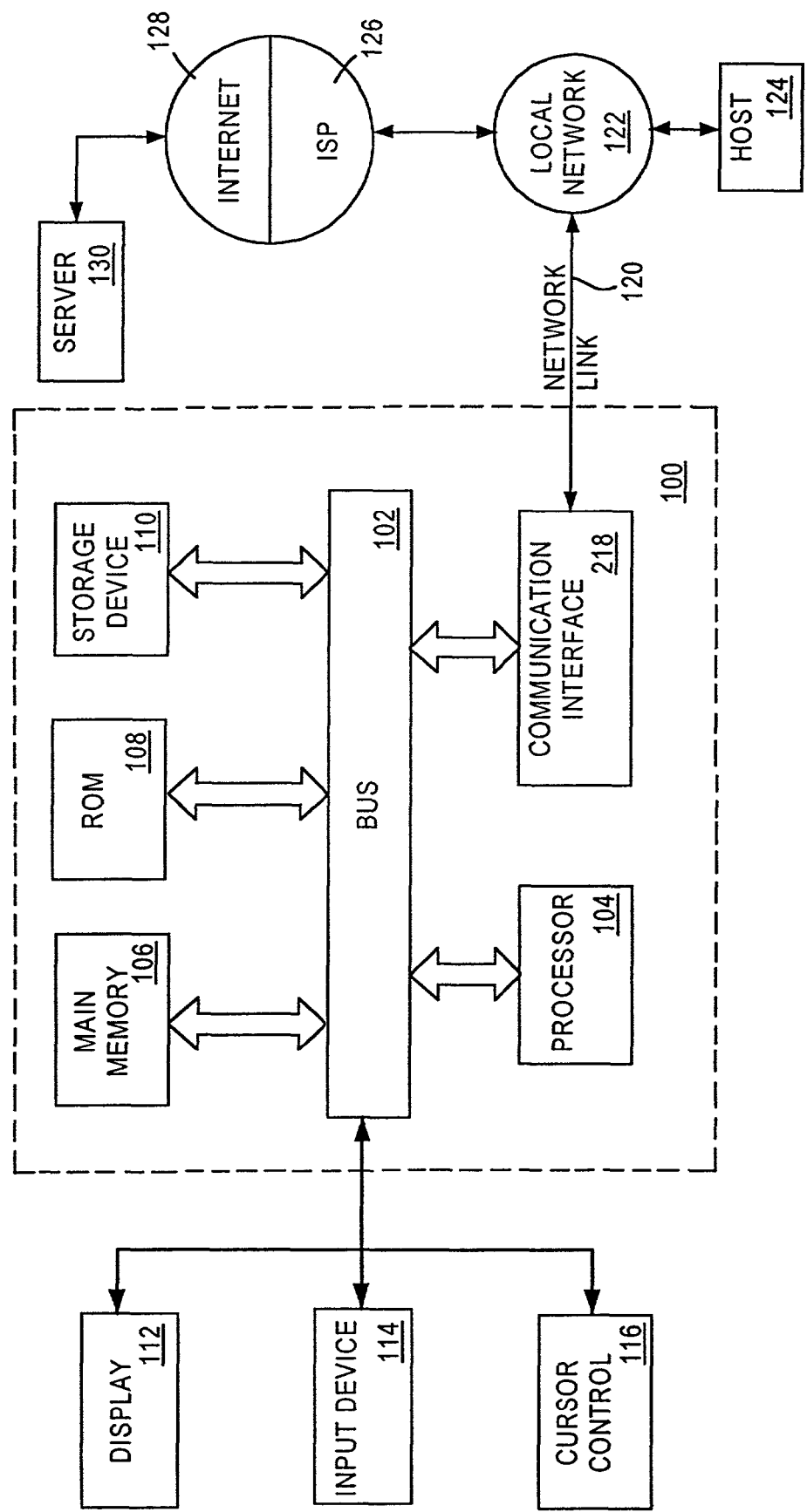
FIG. 1 illustrates an exemplary hardware environment on which the present system can be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for the present inventive system. According to one embodiment of the invention, the system is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for the system as described herein. The received code may be executed by processor 104 as it is received, and/or stored in storage device 110, or other non-volatile storage for later execution. In this manner, computer system 100 may obtain application code in the form of a carrier wave.

Philosophy Applied

Aggregating entire commodity markets with the common, integral services of all customers creates unrivaled profitability and cost-efficiency opportunities. Just as important, however, are the features of the system's cash trading software, and the parameters (trading rules) to welcome the new technological tools as a long-overdue opportunity to enhance market liquidity. Specific examples include:

Procedures for addressing counter-party risk (most common customer concern) are ironically similar to today's market practices. Each member submits and maintains their selection of acceptable counter-parties from system's master member list. Market orders appear on each trader's screen in one of two colors, depending on whether the listing is submitted by their individual "enabled/credit approved" list.

Hidden validity of market orders, counter proposals, and other members' authorized trading list forces players to make faster decisions, leading to higher trade turnover. Hidden validity of market orders, counter proposals, and other members' authorized trading list; forces players to make faster decisions, leading to higher trade turnover Completely automated transactions: (i.e. if a buyer submits a counter-proposal identical to a valid offer, the transaction between two trade-enabled players will be executed and documented without the seller manually submitting his or her acceptance.) To the best of our knowledge, while other sites provide automatic matching, trades must be confirmed with a mouse-click or phone call.

Incorporating and promoting technology to foster the development of 24 -hour trading without physically manning the "graveyard shift" (minimum/maximum prices, change in price proportional to counter-proposal with different delivery terms, etc.) Per above, even during "manual" mode, trades cannot be completed with unauthorized counter-parties.

Posting counterproposals in real time; any other eligible member will have the opportunity to hit the bid or lift the offer (versus others' system of closed negotiations.)

Weekly polls addressing timely issues concerning fundamental issues, such as estimated crop damages from extreme weather, port congestion, etc, with all anonymous responses.

Forums on options strategies, structured finance, improving customer's efficient use of Internet, etc.

Focus groups to address improving market efficiency, standardization of trade documentation and contract execution procedures, and develop industries' XML standard codes.

Technology Components

Software components includes a Software Trading engine; Quote vendor software that guarantees reliability of live feed, reducing the amount of data needed to store on the system; and Back-office accounting software, preferably an MS Excel-compatible, real-time accounting system which can cull a market player's online cash and futures positions and upload/download information to synchronize his/her on and off-line position. Customers are provided with the ability to calculate their total mark-to-market profits and losses within minutes throughout the day by calculator software tools provided by the system. Conventionally, such calculations often takes at least five staff-hours/day at a large trade house.

In a preferred embodiment hardware is selected to provide the redundancy needed to guarantee 99.98 percent reliability. For example, for every server required to run the site, a second server can be housed locally or at a separate location.

To provide security, conventional methods and hardware are selected and implemented such as encryption of data, firewall systems, and other protection measures.

Exemplary Environment

Figure 2:
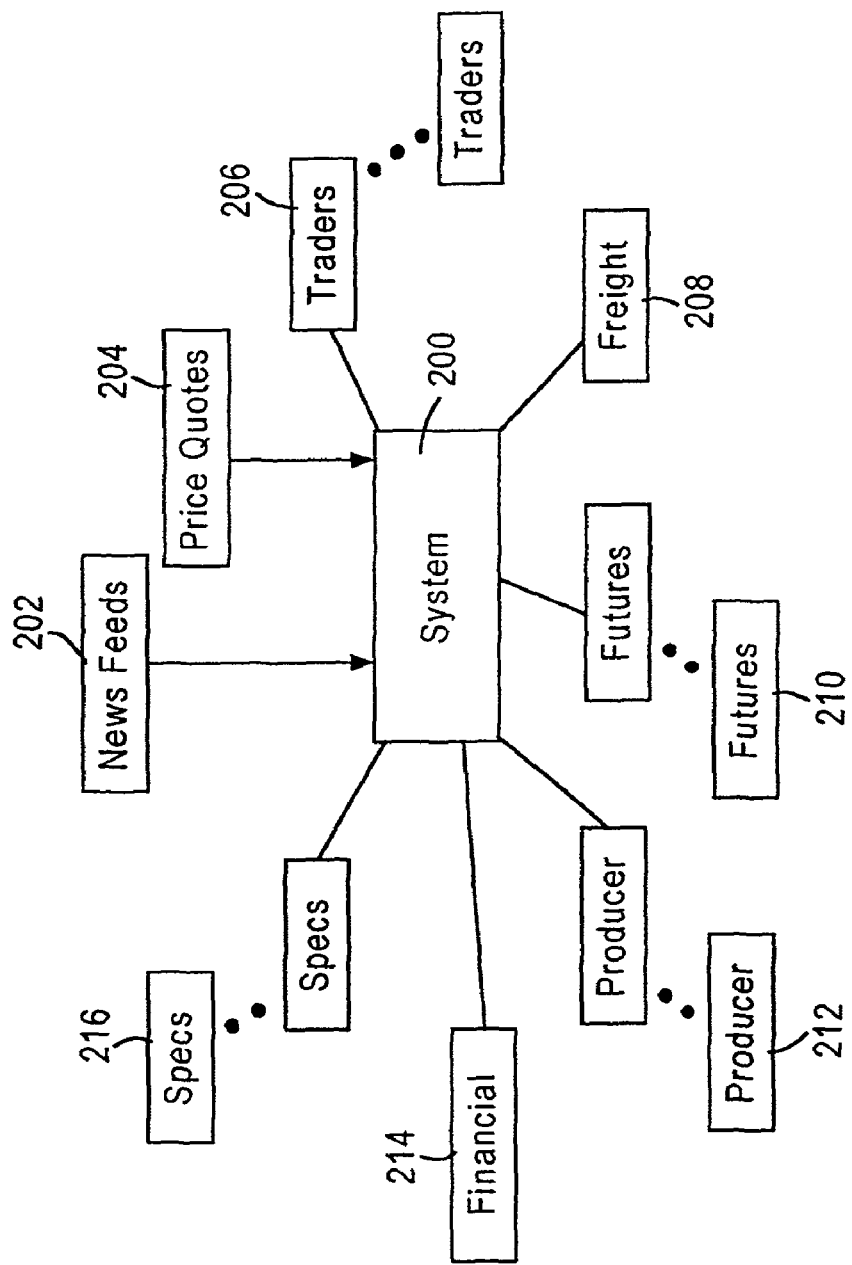
FIG. 2 illustrates an exemplary environment for the system.

FIG. 2 illustrates a schematic overview of the parties and entities that can benefit from embodiments of the present system 200 as detailed herein. These parties can be located worldwide as the web allows communications and data exchanges from any location. These parties include sources of news feeds 202, price quote feeds 204, commodity brokers and traders 206, freight providers 208, futures brokers 210, producers, exporters (and importers) 212, financial service providers and institutions 214, and speculators or paper traders 216.

System Software Components

Figures 3, 3A:
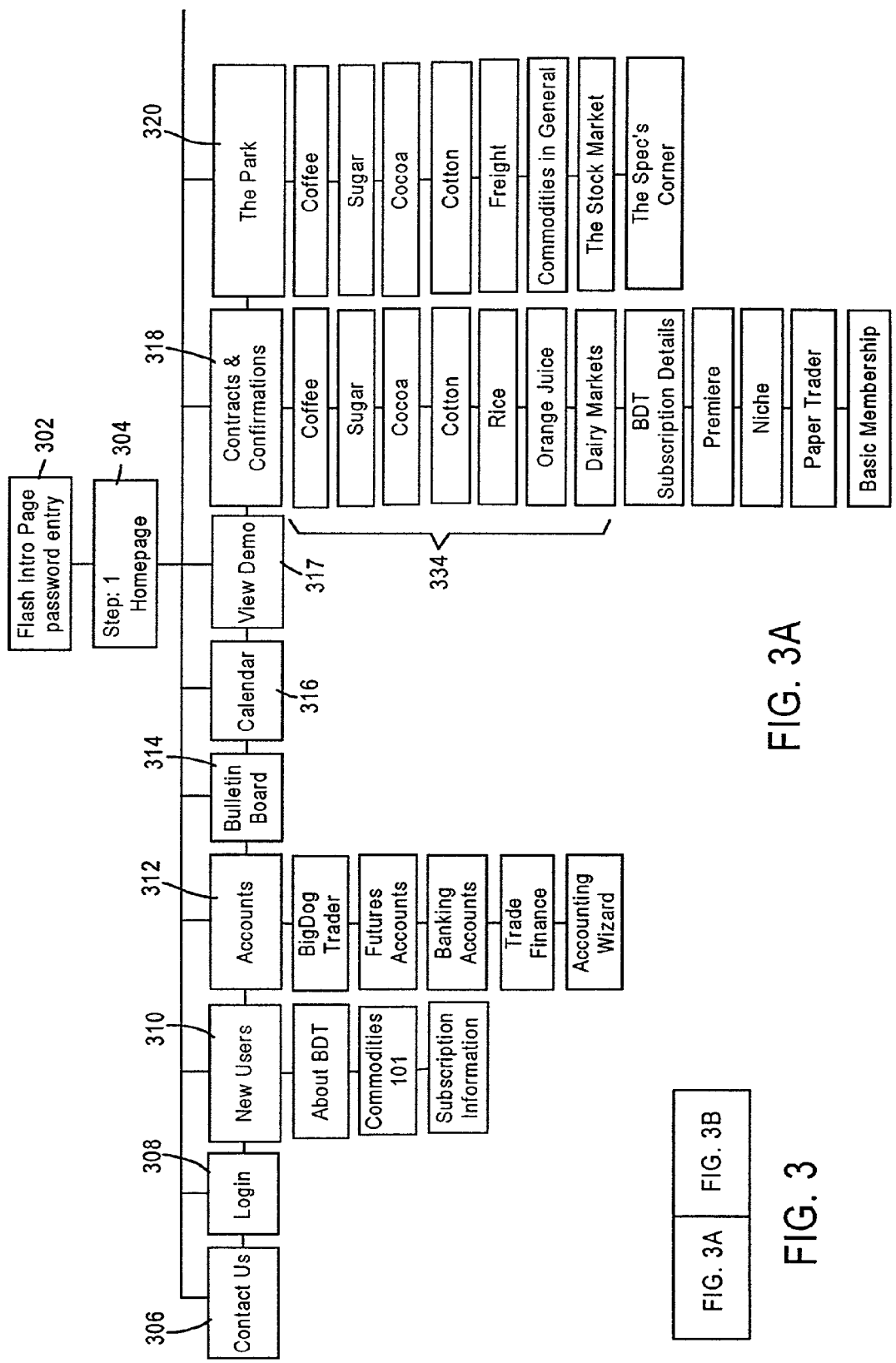
FIG. 3 illustrates a schematic view of exemplary software components used to construct an embodiment of the present invention.
Figure 3B:
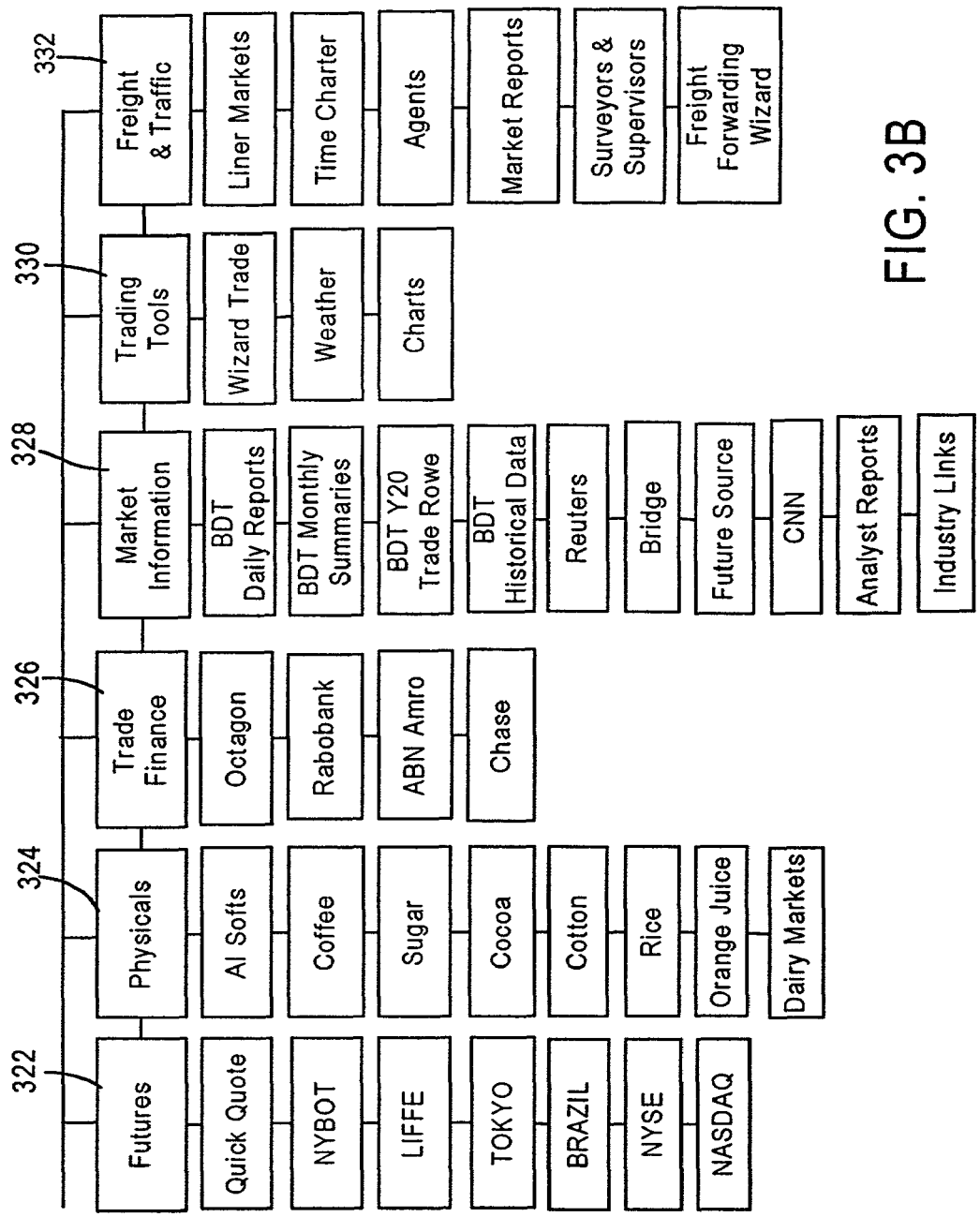

By aggregating various market information, market participants, and a variety of trading tools, the present inventive system provides everything needed to conduct end-to-end transactions, by any type of market player, in the physicals marketplace. FIG. 3 depicts an exemplary organization of the function elements, and an interface to these functional elements, of the present system.

In a web-based embodiment of the present system, the elements of the interface would typically be implemented using Java, dynamic HTML or other similar methods for providing active content to traders and other market players using a web-browser to access the system. The underlying software implement each function, would typically include off-the-shelf technology where available and robust custom programs when needed. Each of the various links and interface elements provided by the system can be displayed independently. Typically a user will simultaneously utilize three or four active display windows that that can be appropriately sized depending on what particular trading activity the trader is are performing.

The system can provide a visitor an introductory page 302 or a homepage 304. From the homepage 304, a number of links can be made available to a visitor such as links to site contact information 306, new user information 310, a bulletin board 314, and a demonstration of the system 317. A login function 308 is also included to control access to certain areas and functions of the system as well as to personalize and customize a user's visit to the system. By using a login system, access to many of the system's features can be limited to members. Furthermore, by segregating the members into different levels of membership, access to certain features and information can be further refined based on a subscriber's membership level.

Once logged-in, a user can take advantage of the electronic exchange and the trading tools and information described in detail herein. For example, the user can choose to enter a physicals marketplace 324 such as coffee, sugar and rice which is implemented, in part, through the use of a matching (or trading) engine. Within each of these marketplaces, the user is able to view trading activity and place offers and bids.

Links to other parties that support physicals trading are also provided. The user can access links to financial institutions 326 (e.g., Octagon, Case, etc.) that are involved in the trading process. From these screens a user is able to inquire about and receive confirmation of credit and financial services offered through these institutions which facilitates the trading process without ever leaving the system. The user can also access links to freight providers 332 which permits the user to work with freight forwarders without leaving the system. As explained further herein, many of these features are used automatically upon the conclusion of an executed trade so that financial, and other, service providers receive notification and information about a completed trade.

Because information about the futures market is paramount to profitable trading, a link to futures information 322 is provided that allows a user to view data from one or more markets such as Tokyo, Brazil, etc. Links to other, more generic, market information and news sources 328 is also provided from the system. These links provide access to real-time data feeds from Reuters, CNN, Analyst Report as well as more static data such as industry-related links, and daily or monthly trading summaries generated by the system.

Other tools can also be accessed by a user of the system to help with the trading process. A calendar tool 316 is available that parses real time data feeds to permit informing a user about upcoming dates and activities in different market areas. Preferably, the resulting calendar can be downloaded and imported into other personal scheduling programs such as Outlook and LotusNotes. Other tools available to a user are trading tools 330 that include a trading wizard that permits a user to define rules governing automatic trading, charting tools to visually display various market data, and weather-related tools.

The system includes a contracts and confirmations area and wizard 318. Using this wizard a user has the ability to select standard contracts and other provisions agreed upon by other traders. Utilizing such contracts allows for quicker trade execution and also allows a level of confidence and predictability for all traders.

The Park 320 is also available to a user to permit the user access to specific formal and informal forums of information that may be of interest to the user.

An Exemplary Trading Session

Figure 4A:
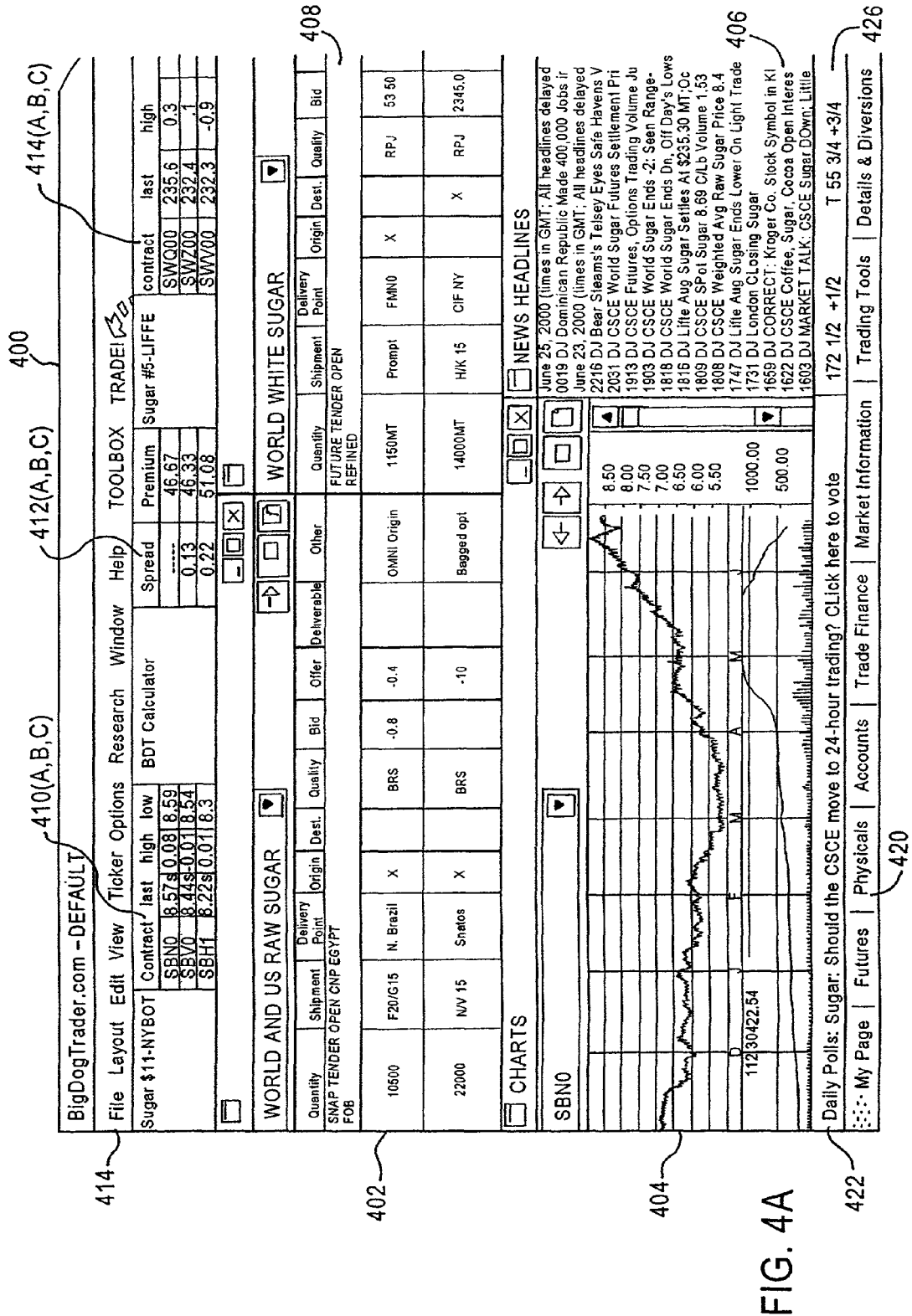
Figure 4F:
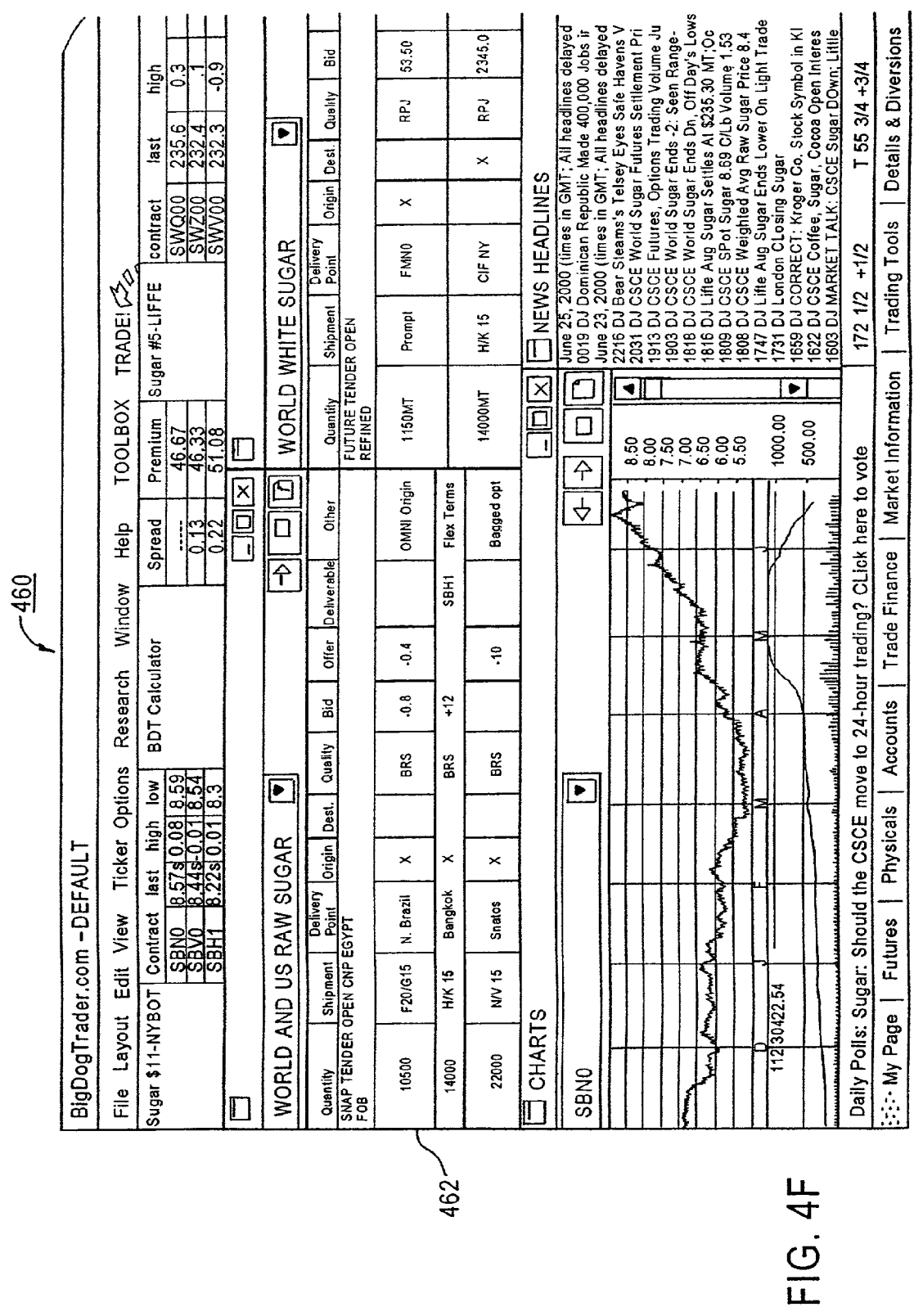
Figure 4K:
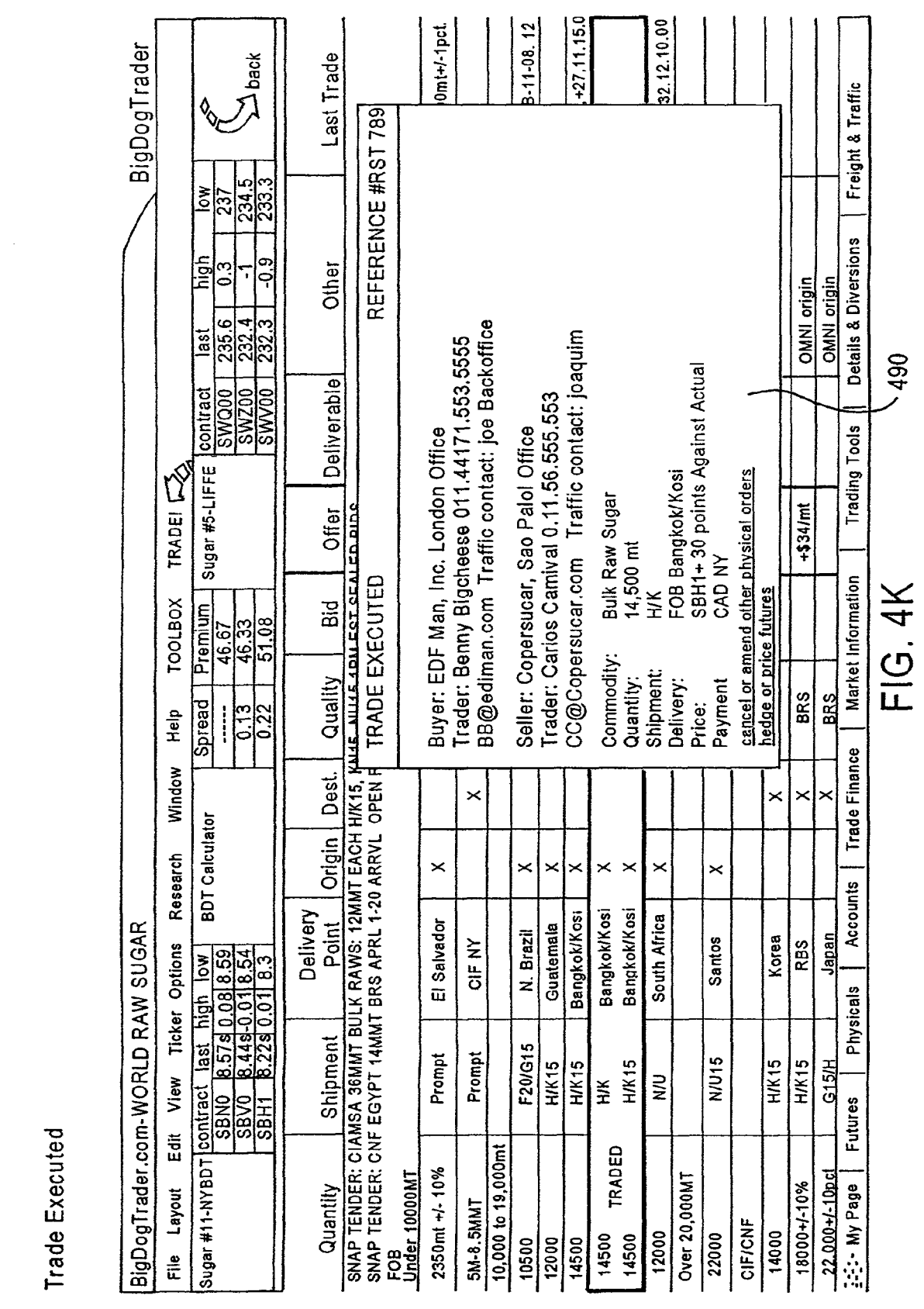

During an initial visit to the system, a trader (or other user) provides business-related information, personal preferences, and other data to customize future interaction with the system. FIG. 4A depicts an exemplary screen display 400 presented to a user of the present system after logging into the system, typically by providing a username and password. The system provides standard templates in each market for each user type, for example screens that are important for a trade house user are different than those for an importer. This way, all users may register, log-on and begin using the system immediately Some of the information on the display screen 400 is customized by a user's preferences, such as the particular information displayed in windows 402, 404, 406 and 408. Other information such as the menu bar 414 and the link bar 420 are parts of the system. The menu bar and links bar can, however, vary depending on what type or class of member a particular user is such that certain links are only available to certain users. Although all are customized for the system's graphical user interface (GUI), real-time information presented in windows 410, 414, 404, 406, and 426 are provided by an external data vendors such as Reuters, FutureSource Bridge or Data BroadCasting corp. The present system subscribes for the maximum amount of information the vendor aggregates to provide enough functionality for the financial trader, who monitors all financial news and over a dozen futures contracts in five different markets, as well as for the trade house user who prefers to see news selected by the keywords "sugar" and "Brazil" (screen 406 ) and a tick-by-tick chart of the nearby sugar contract, supplemented with the volume, open interest or other technical indicators (such as in screen 404 ). Screen 426 is a "snapshot" window where users may select a quick quote options for the most recent value of a particular futures or options or equity contract, or display a streaming chart of all price quotes within a particular market. As shown, these windows include drop down menu boxes that provide a user with a full spectrum of functionality menu of choices rather than requiring the user to remember various abbreviations for different markets. As with all data vendors, the user has a high degree of functionality such as ability to compare data, right-click a news headline to lead to the full story, multiple charting features and ability to download and store the information. In the exemplary screen 400, window 402 displays the bid and offer information relating to World and US Raw Physical Sugar; window 408 displays the bid and offer information relating to World White Physical Sugar;. This information is generated from the system's own trading engine (real-time posting and matching algorithms). The system also provides polls and questionnaires 422 which are developed, presented and analyzed by the system's offline trade support. This feature, taking full advantage of the system's anonymity, provides traders with valuable market sentiments that affect market pricing and further supports the systems ability as a source of market information.

Of particular use to traders, is the layout of screens 410, 412, and 414 which the system has named "the strip." Boxes 410 and 414 display real-time activity of a traders' two most important futures markets (those that affect physical purchases and sales the most). In this example, 410 is the NYBOT raw sugar contract and 414 is the LIFFE refined sugar contract. Again, initially, these are selected by the system for each market, but can be altered and saved by each user. Provided by the system, the middle box 412 updates two types of differentials in real-time . 412 A automatically calculates the differential between each contract's delivery periods 410A, B and C and the right hand calculating the difference between two separate contracts with similar delivery periods (410A and 414A). Known as spreads and arbitrage respectively, this automatically displays futures and physical trading opportunities when activity in either or both markets causes disparity. The strip is an independent window, set by default to remain open and overlaid on any other window the user may open (system window or otherwise). An example of this feature's importance is the ability to monitor market movement while in the process of submitting a market order.

When a user wants to focus on one display screen, for example to conduct a trade, that screen can be selected (by a mouse selection or key-stroke) to fill a large portion of the display screen as depicted in FIG. 4B. The window 402 is shown expanded, in FIG. 4B, to fill most of the display screen. This market screen 402 shows information about various bids and offers that are pending in the market and is the standard template used for each market, whether sugar, wheat or otherwise. It displays the minimum amount of negotiating points that must be addressed before users will agree to the purchase or sale of the underlying product. Each market's trading screen is sortable, expandable and collapsible by its negotiable fields ( 405 A-I). While the amount of negotiable fields is not expected to change in the long-run, the system has taken the initiative to establish groupings and categories within each field, such as 405 F. "BRS", for example, is the system's code for 'bulk raw sugar.' As explained later in this document, the system will encourage participants to continually reduce the amount of subgroupings as it is more conducive to building liquidity and streamlining the trading process. In this example, the system- on and offline, will encourage participants to express buying and selling interest by the broad "Bulk raw sugar" instead of the current custom of the trade to specify "Colombian or Guatemalan bulk raw sugar" The broader and more standard the terms, the easier it is to trade (and thus build overall market liquidity). By way of example only, the orders are segregated into categories based on weight. For each order (i.e., row), the trading variables are displayed to permit evaluation of the order. For example, in the sugar market, these variables include shipment timing, origin and destination point, commodity quality, bid and offer particulars, deliverable specifications, and other items. Also, unique to this system is the ability to combine a full "many-to-many exchange," as often referred to by off-the-shelf software companies such as Ariba, with a "one-to-many" auction-type feature as shown as "snap tenders" 430 for this particular market. These snap tenders 430 are different in that they are received from importers and exporters who wish to invite public (members only still) or private (selected members although displayed publicly) offers or bids respectively. This in known in some industries as an RFP (request for proposals) except they are typically requested and executed within a matter of hours.

Many market participants are reluctant to trade with unknown parties and, therefore, have a limited number of parties that they will trade with. During the initial account set-up, a user is given the opportunity to identify those parties with which it will trade. For a trade to occur, each party must have identified the other party as an acceptable trading partner. These preferences are used in displaying the order information in window 402. For example, text color or other visually distinctive methods can be used to indicate which orders are possible and which are not. For example, allowable trades may be presented in green while forbidden trades are depicted in red. Column 405K, "last trade" is provided by the system, but separately from the trading engine software. This column, expandable by right clicking the cell, culls recent bids, offers and trades the search engine identifies within the system's database.

Once a trader determines the desirability of making a trade, the TRADE! menu item can be selected to cause dialog window 432 to be displayed. In this window, the trader can enter a market order (bid or offer) by completing all the radio buttons, text boxes and drop down menus. The drop down menu choices and radio buttons are customized based on the particular commodities market. appropriate for trading that commodity. Again, window 432 displays the minimum amount of issues that need to be addressed between buyer and seller. The drop-down selections are usually selected by the system within each market based on the most common or likely characteristics that that a trader typically manipulates to construct an order having the precise characteristics desired would trade through the system. The exemplary window 432 display options for the sugar market; an order window for the rice market, for example, would have different countries selected under "delivery point".

Column 436 presents the opportunity for the user to establish flexibility regarding any or all the negotiating points. These fields are set by default to "no/none/zero" so that market orders may be submitted as swiftly as possible, with only the items in window 432. allows a trader to describe what characteristics about the trade do not have to be exact matches to still qualify as a matching counterproposal. In the exemplary window 440, the trader has selected acceptable variances in quantity, shipment time, price, pricing, etc. This ability to add flexibility of acceptable terms (consequently, providing the algorithm with a higher match rate of bids and offers) is the beginning of the Autotrade Wizard, an integrated software application designed by and provided by the system and explained later.

One of the characteristics of the order that is selectable by the trader is the "validity" which is likely the only feature that mirrors current offline customs of the trade. For example, the shortest validity would be "fill or kill" (shown for maximum of 15 minutes) or "Good Until Cancelled". This validity information, however, is not disclosed to the other traders in the market. By hiding this information from view, other traders will be unsure for how long an order will be valid. This uncertainty may increase the pressure to negotiate regarding an order for fear of losing an opportunity by procrastinating. One other unique feature is the ability to enter hidden flexibility within the order such as displaying a bid at a certain price but accepting to pay a higher price (as specified to system but not displayed). Again, this feature increases the potential for to increase volume as the matching algorithm is likely to meet more success.

Button 435 shows the user that the system is functioning fully and the prices displayed on the screen are the most recent. If the user has the time and desire, he may select "go to Autotrade wizard" which enables him to establish more flexibility and negotiability of the market order. Alternatively, for the swiftest and simplest process to post a bid or offer, the user would select "enter order" which prompts a confirmation window 440 to be displayed, as depicted in FIG. 4D. This window 440 gives the trader the opportunity to review the order before submitting it for trading. Note that a bid number BRS 123 is in the first field. This feature allows users to save bids and offers and templates for commonly traded items and is used with many of the system's risk management software.

Selection boxes 442 allow the user to select whether "to turn on" the flexibility he has described in the Autotrade wizard or negotiate the points manually. Selection of 'Autotrade' will be dimmed and blocked if he has not entered any flexibility in terms. The trader also can select from boxes 444 to identify the current order as a new order, a replacement order, or a temporary substitute order. This prevents the user from "double-booking" in active markets (overbuying or selling). By selecting the SUBMIT button, the order is entered into the market for trading.

FIG. 4E display window 452 that is the same as the window 402 of FIG. 4B except that the new order 454 is now displayed. This window 452 is updated in real-time once the order 454 enters the market on everyone's display who is currently viewing that market. Thus, another trader's screen 460 as in window 4 F having an active display 462 of World and US Raw Sugar will see the new order and can select it for trading. Once that order 454 is selected on the screen 462, by a mouse selection, key stroke or other input event, details of that order are displayed in window 466, as depicted in FIG. 4G and the trader can execute the order as it stands, enter negotiations regarding the order, or ignore the order. Only trade-enabled market orders can be selected to for detailed viewing (those in which user has identified as acceptable trading partners); trying to select a forbidden trade will not result in the display of any additional information and is a feature that is intended to encourage the overall market growth and liquidity by acceptance of new and or more trading partners. Note that the time the order was submitted is displayed (time ext.), but not the order's validity.

If the trader selects negotiate, then the counter proposal screen 470, as shown in FIG. 4H, is presented to the trader. Preferably, the counter proposal screen displays the original order 474 and its allowable variances and automatically populates the counter proposal fields 472. Once the trader modifies the counterproposal fields as desired, the counterproposal can be submitted, with an appropriate confirmation opportunity 478 as depicted in FIG. 4I with the same flexibility and protection features to freeze, cancel or maintain similar orders of the user. This counterproposal by default selects 'Autotrade' as they will automatically be considered against the flexibility of the original market order.

Once the counterproposal is submitted to the market, the display window 480 on all traders' screens will be updated in real-time to reflect the counter proposal 482. Thus, all traders who have both parties "trade enabled", not just the two trade participants, have access to the details regarding the trade. Moreover, such access to these details allows other traders to step-in and accept or counter-propose to either the original order or the counter proposal. This market pressure results in faster trades and quicker negotiation decisions and, therefore, improves market liquidity.

In this example, even if the initial trader had selected manual, the system would match the bid and offer since the proposal falls within the visible and/or hidden terms the original trader selected. Also, with "Autotrade" selected, the submitting of the counterproposal by the second trader will be recognized by the matching engine of the present system as a matching order and automatically execute the trade according to the terms of the counterproposal. If the first trader had selected manual trading, then the matching engine would have caused a query message to be sent to the first trader asking for approval before reverting to terms specified in the Autotrade wizard to automatically counter-propose negotiate and potentially trade with the counter-proposing trader.

As shown in FIG. 4L, once a trade is executed, a confirmation screen 490 is provided to both traders with essential details about the trade and the trade participants. Up until this point, the traders had been trading anonymously so that their identities did not impact this particular trade or have an effect on the other participants in the market. The rest of the market participants only see that the trade has occurred with terms showing in 405 B through-I in window 4 B.

The contact information is maintained by the system and is required for various software applications to function as explained herein in detail. Note that a specific trade number is generated upon confirmation of the trade. This reference number, or tag, is unique to this trade and will be associated with every action and/or calculation made throughout the contract life, beyond shipment and payment and ending only upon final contract liquidation. This tag is relevant and will be referred to in descriptions of the system's ancillary software. Also upon this confirmation, both trader's designated freight forwarder and accounting subordinate are sent email notices (outside the system as a means of increasing reliability of information flow). This process notifies them that the position has changed and automatically asks them whether they wish to associate their customized set of preferences or modify them as further described in risk-management software section.

Immediately upon completion of a trade, each counterpart is given the transaction number that the system assigns, for example, sequentially. In illustration 4 K (element 490), both parties are issued a trade confirmation labeled RST789 (representing "raw sugar trade" in this instance, intuitively chosen for ease of conversion to XML coding when the industry formally accepts and establishes the electronic definitions of industry terms.

This label is a unique identifier that remains associated with the transaction until the two parties have completed the trade's final liquidation. Any action, alteration, correspondence, etc. that the trader or his assigned freight forwarder or accountant enacts (assuming permission to do so) is identified by the same confirmation label. Therefore, although trader 1 and trader 2 have the same file (virtual file folder) name on their proprietary database, the notes, calculations, correspondence etc. that are attached to it are unique to each party and confidential from one another. This tagging system, implemented through technology, such as that provided by TIBCO, is the most significant and most visible mechanism in which traders will dramatically increase operating efficiency and reduce transaction costs. Examples are provided within the context of explaining the following ancillary risk-management and trade execution software.

Forms Wizard

FIG. 5 represents the "forms wizard", a database of each type of standard form required or often requested within each industry. Noteworthy is item 500, a live snapshot of the market that enables the trader's ability to continue monitoring the market while executing traders. Forms wizard adds value to the user in three ways. Foremost, in box 502, the seller (per custom of the trade) is able to generate a contract for RST789 by selecting the item "bulk world raws." A pop-up menu will ask the trader to input the trade tag and almost immediately, the system customizes the industry's standard raw sugar contract replete with all specific variables as negotiated by the parties and confirmed by the system. This replaces the antiquated, but current method of copying similar contracts in a company's database and manually changing information on the buyer and seller's trader, company name and contact information, negotiated price, delivery period, delivery point, payment method, etc. Note all raw sugar contracts are already grouped into one standard category versus a multiple of regional standards ("Brazilian raw sugar terms", "TSTC terms for sugar originating in Thailand, etc). The system is scalable to build a database of terms associated with items that presently trade using the broad "other" column. (example: "Colombian terms," a negotiating point in today's market, would be in the "other" field and the system would integrate the original exporter's preferred/required restriction of the sugar's destination). Upon gaining acceptance as the official trade contract (versus "trade confirmation" that is also required today, the service provided in box 502 and similarly in boxes 504, 598 and 510 will greatly reduce inefficiencies of the trade documentation process that exist in today's market. The selection and subsequent form generation process is also able to generate charter parties, bills of lading (Item 512) as well as standard requests for payment, issuance of letters of credit and structured financial products (item 514 B). Especially upon the acceptance of electronic signatures, the customization and feature that indicates whether the documents have been amended by either party substantially reduces the time and expense of a trading group in comparison to today's procedures. This application also provides the ability to generate standard, pre-trade correspondence such as requests for quotes from banks and boutique financial entities offering structured financial products (Item 514 A). The trader, having created or modified an order ticket (BRS123 in preceding example), simply selects the type of request, which (or all) venders to submit to, and the order ticket number. Once the vendors return their indicative quotes, the system attaches it onto BRS123's cost worksheet (see DealPorter), eliminating the need to reference additional sources when trader is ready to submit a bid or offer. Finally, as discussed in the PNL-Watchdog section, since most agrimarket's payment authorizations and acceptances are filtered through a corporate-level division, the system's common structure for all of these markets becomes further advantageous.

Profit and Loss Wizard

This application replaces information that all members of a trading group presently receive only once daily, after all relevant futures markets publish settlement prices. While the ability to assess one's position in real-time at any point during the day is the main benefit, this system a) provides several features to expedite a swifter, more thorough and accurate analyses of trading opportunities and market movements as they affect the company's overall risk position and b) replaces a 7-page paper report distributed to each trader, freight forwarder and accountant. Item 600 displays examples of the software's ability to customize the appearance of the report by dollar values, metric tons (quantity), or by equivalent futures contracts (hedges). Though many users (via passwords) will be restricted from certain views, a group's division head may further analyze the data by region (tonnage), quality, by each of the group's traders. Examples of the software's functionality include ability to view what their position value is based on intra-day futures values (i.e., at this moment vs. settlement). If a trader has been restricted to a certain dollar value, he may monitor his running total and have the system notify him when nearing his limit. His manager, on the other hand, has the authority to automatically buy or sell cash or futures if the futures market or the trader's position reaches a particular value. All traders may use the system to calculate the hypothetical effects a trade would have on the total value which is a risk management feature presently unavailable in real-time. Positions are calculated using standard mark-to-market procedures: taking the futures values as shown in 604, the differentials between markets-data automatically calculated by the system (602) and finally, using the values listed in 608, representing cash values. Since traders and accountants have the ability to accept values the system publishes on its rateboard (based on weighted average of prices and volumes quoted and traded within the system each day), ability to change by dollar, point, or percentage increments or manually update only those values that changed since the previous day, calculating the position is virtually reduced to the amount of time it takes the trader to update the fields in box 608. Presently, an internationl tradehouse that averages over three million tons of annual volume with multiple geographic and group positions would require a minimum of 4-5 man-hours per day. Views and details are fully customize-able and can be integrated with several other applications such as the Arbitrage Watchdog that culls data from the position, data feed and the calendar. In this particular view, the trader has chosen to break-out the position by quality of sugar, as shown in 610. Note as well that the last three columns in both boxes are collapsible.

Depth of Profit and Loss Watchdog

In 610, if a trader clicks on the box containing "12,000" under the column "far east cash" and the row "March" the system opens another window displaying the detail within that month's position. For example, a trader would see five sales of 12,000 tons to Far East destinations and six purchases of !2,000 tons, all labeled with the original number issued on the trade ticket. Clicking on RST789 leads the trader to another window providing a high level view of the contract's terms (counterpart, price, quality specifications, internal valuation, etc). from here, the user has options to a) view the pricing and hedging activity to date, b) launch the transaction's DealPorter or a summary of it's actual versus estimated profitability running total, c) hypothetically amend specific terms to see its affect on the total position and to calculate the value (maximum amount to propose or accept) to amend the contract accordingly. Box 612 collates both physical and futures options and will become of increasing importance to the trader seeks to take full advantage of technology's ability to increase the volume of trades and the level of sophistication regarding risk-management alternatives (the majority of new opportunities lie in option plays). Cells in 612 represent cumulative values, expandable in the same manner as 610. To calculate total values, users may use the Deltas and other "Greeks" generated by the system or their own values. This area contains an imbedded calculator designed specifically for values of physical commodity options. Item 614 illustrates the systems' futures position by the clearing entity presently holding the contracts on the user's behalf. In conjunction with Dealporter, the system's ability to notify traders and clerks of disproportionate balances among brokers or number of trading sessions remaining before expiry are particularly useful to avoid common and costly issues once contracts begin to become more illiquid in its final days

Autotrade Wizard

As introduced in the original trade ticket, all features of the AutoTrade Wizard are designed to foster the growth of automatic, 24-hour trading. Foremost, one of the system's trading rules is that the user is committed to accept a counter offer if it meets the published and hidden parameters. This means that unlike any other electronic commodity exchange, a trade may (and will) be confirmed by the system without either party manually clicking a button indicating "I accept" or "Ok to trade, etc.".

Autotrade wizard builds upon this philosophy by enabling the system to generate a series of responses to counter-offers on posted orders and the ability to alter orders based on indirect factors. Ideally, traders would post their "ideal" bid or offer on the screen, then sharpen to a more realistic (tradeable) order using basic Autotrade flexibility such as those listed in Item 700 (which can be displayed or hidden). Item 702 shows the system's ability to fulfill a partial or complete long-term contract, such as one a trade house would have with a processor or distributor. Item 704 displays the responses the trader would make if he received a counter offer that varied as he identified (expected). Example: A division head in London wants to buy a cargo of Colombian raw sugar (DP delivery point). He knows it's rare so he establishes likely scenarios since he will be traveling to New York and missing the day's trading activity. As he anticipated, a counter offer comes back with Guatemalan raw sugar. Trader 1 has identified this as acceptable, but only if the offer is reduced from his original by 10%. The system automatically responds to Trader 2 with the delivery point "Guatemala" and the amended, reduced price. Trader 2 is amenable to the reduced price if Trader 1 will amend the shipment period (SP) to provide an additional two weeks at the end of the presently specified term. Trader 1 foresaw this possibility as well, and agreed to accept it if the price is further lowered specifically, for example, to 10.23 cents/pound. Trader 2 sees the acceptance of the new shipment period, the new price, and accepts the terms. The trade is complete, and upon exiting the plane, Trader 1's mobile phone is flashing a message that he has traded this order ticket. Although not displayed, the system is able to execute futures orders automatically to hedge the traded business (if desired and selected). Traders may enter an unlimited amount of variables for each negotiable field (i.e. five different delivery points, varying quality, etc) at the same price or amended price. Once all are entered, the trader ranks them in the order of desirability, so that the system may accept all the changed fields he identified, but only at the price that the system calculates based on a weighted average of the trader's preferences.

Item 706 shows an example of the functionality available when he is not able to monitor his position from the office. Item 708 shows features that a trader may select to alter an order based on activity in a designated futures market. For example, if the specified contract trades above a certain price, below a certain price, over or under a specified volume, he could have the system remove the order, "freeze" it, alter is per section 708. This section gives the trader the ability to automatically change an order's based on the trader's The last step before confirming acceptance and his amended bid or ask in. As each affect price, the trader negotiating variables the trader is willing to accept if shows typical system.

Arbitrage Watchdog

Figure 8:
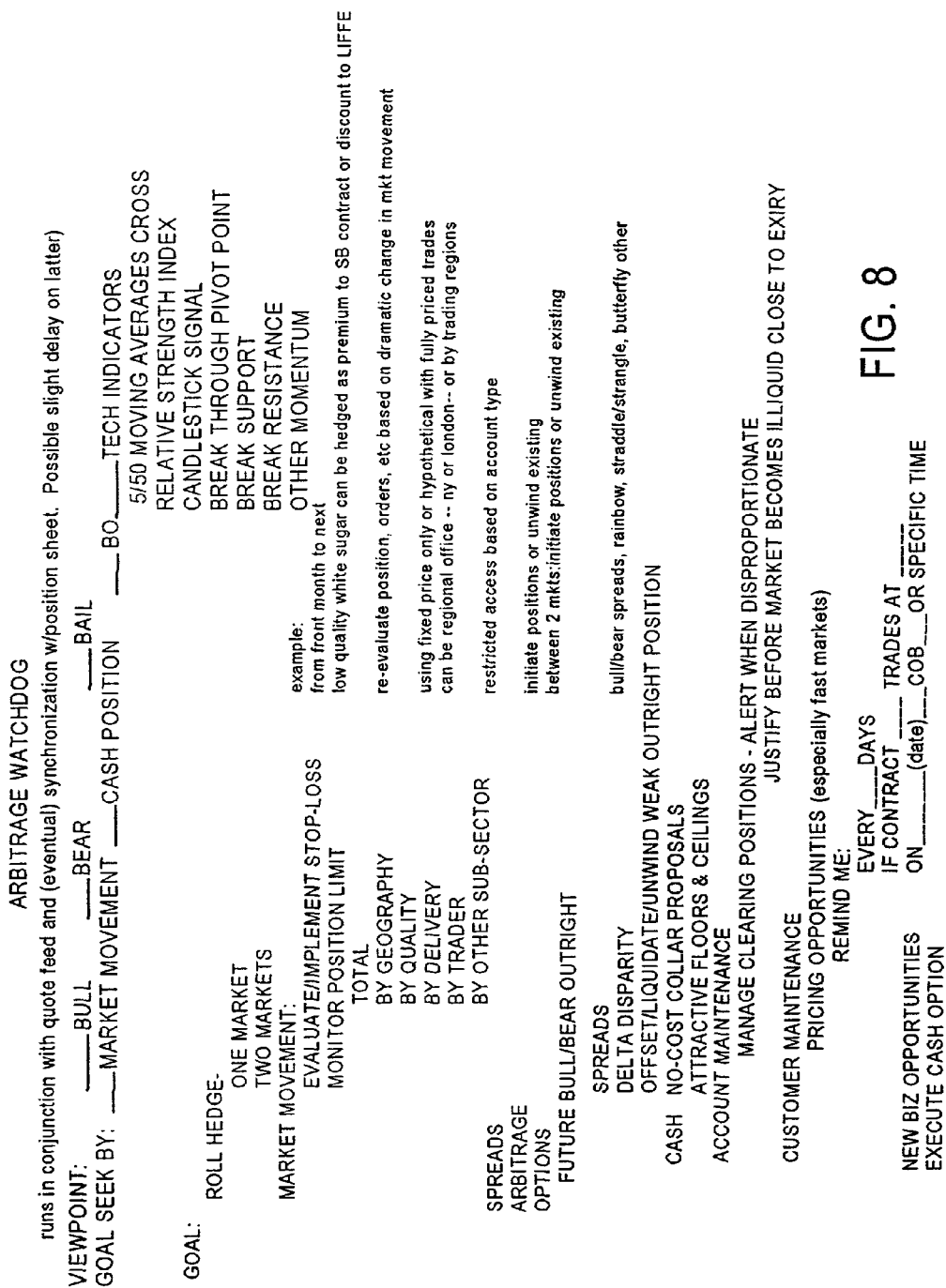
FIG. 8 illustrates an Arbitrage Watchdog in accordance with an embodiment of the present invention.

Arbitrage watchdog, FIG. 8, combines the functionality and data primarily from the position sheet, data feed and calendar function. In sum, this calculator will continually look for opportunities in real-time that are not easily detectable in fast moving markets, or are not deemed as priorities by the trader but add value to the process or to customer relations in the long run. For example, complex options plays such as butterfly spreads and eventually rainbow options and weather derivatives as are presently in use in energy markets. Users may select an option to automatically email an exporter from whom he has made a purchase, for example, suggesting that since the market is rallying, he may wish to establish the contract's trigger price. This software could look for options, spread and deferred arbitrage opportunities in the futures market and automatically submit the order with a broker. It may also trigger a reminder for the trader to take advantage of his contract flexibility and roll a hedge from a nearby position to a more deferred one, for example.

Calender

The system builds a database of all events pertinent to physical and futures trading for all agricultural markets, as well as include online training and forums. All data can be color-coded by physical and futures information, then by commodity, then by source. In FIG. 7 for example, users viewing the listing on Friday, June $9^{th}$ "Wasde" would know by the color or font that the item is a report that will be issued by a government agency having potential to affect prices. A financial trader is likely to select only and all information pertinent to futures markets and would have the system notify his handheld or phone on the date a specific contract expires. Users may sort, filter save, and search by keyword, add personal items, download and integrate with handheld or desktop device software, and set up triggers and reminders report would have a color or hue representative of physical market information and a "hue" or unique font to indicate it is a report issued by a government agency. This software also has a feature that integrates with Dealporter; as an example the freight forwarder may run the application taking the data contained in the Calendar to ensure that dates of required vessel nominations, deadlines to open letters of credit, and/or final settlement dates are not affected by the counterpart's banking or government holiday.

DealPorter

FIG. 9, DealPorter, is a dynamic, virtual assistant to the trader, accountant and freight forwarder. It is created as early as a pre-trade indication for the availability and cost of trade finance, political risk insurance and freight calculations (latter taken from The system's rate board, electronic correspondence from the system's selected vendors, or manually) It is a worksheet that can be saved for use with calculating the basis in commonly traded bids and offers, it is a reminder feature for the freight forwarder to avoid the common and costly mistakes of missing the deadline to charter freight, nominate the vessel to load port, open the letter of credit, etc. Many trade houses highest operating losses are typically in this category. DealPorter is a supplement to the PNL Wizard, calculating up to the minute actual profits and losses verses budgeted at the time of trade, broken down by each cost component in the calculation. It tracks all documents—amendments, counterparts it was re-sold to, bids or offers received for it, etc. Another feature is the ability for DealPorter to read cash and freight values from the system's rate boards, add it to each cargoes specific cost calculations and suggest the most profitable allocation (matching) of purchases in the system with existing sales in the total position. This is known as book squaring in many trading arenas.

Export and Import Scheduler. (FIG. 10)

This software is as valuable to importers and exporters as the DealPorter is to high-volume trade house traders. Using an Exporter as the example, the trader enters the start date of his crop, his grinding (cutting, picking, harvesting) rate, storage capacity, interest rates, overtime costs, cost and time requirement to alter the quality of the output and minimum and maximum domestic commitments and/or min/max export or specific quality commitments. The system then processes this data using the system's physical commodity rate board and the corresponding value of futures used to price the contract to come up with the most profitable suggested schedule of sales and exports. While it is assumed many have their own spreadsheets to calculate the same, they do not have the ability to calculate the same virtually in real time, or to run automatically and notify the trader when the system indicates a change in the schedule. As a distributor's optionally is doubled (as both importer and exporter, the software is especially valuable. Once domestic and regional trading become available within the system, the importer, exporter and processor may become reliant on this application to compute optimal schedules around the clock since it now gives them the ability to compute all cash values (domestic and external) in real time, with accuracy.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. The invention is capable of other and different embodiments and its several details are capable of modifications in various obvious respects, all without departing from the invention. Accordingly, the drawings and description are to be regarded as illustrative in nature, and not as restrictive.

What is claimed is:

1. A computer-implemented system for commodity exchange, comprising:
   i) a commodity exchange interface configured to display data substantially simultaneously to at least a first customer and a second customer, wherein each of the first and second customers is an end-to-end market player;
   ii) the commodity exchange interface including at least a first real-time, dynamic trading window associated with the first customer and a second real-time, dynamic trading window associated with the second customer, wherein each of the first and second real-time, dynamic trading windows is configured to display for a specific physical commodity at least the following:
      a) a negotiable quantity of the physical commodity, wherein the negotiable quantity is an amount of the physical commodity that is tradeable on a domestic, regional or international market and wherein the negotiable quantity is negotiable in amounts that are not limited to a standardized contract size;
      b) a negotiable shipment period for the physical commodity, wherein the negotiable shipment period specifies at least the time period at which the physical commodity is available for pick up or delivery and wherein the negotiable shipment period is negotiable in amounts that are not limited to a standardized delivery time period;
      c) a negotiable quality for the physical commodity;
   iii) the commodity exchange interface including a system to allow for direct negotiations prior to contract formation between the first and second customers for at least the negotiable quantity, negotiable shipment period and negotiable quality; and
   iv) a set of program instructions configured to process at least one commodity trade made directly between the first and second customers, the commodity trade being updated in at least the first real-time, dynamic trading window associated with the first customer and the second real-time, dynamic trading window associated with the second customer;
   wherein the commodity displayed in each of the first and second trading windows is selected from the group consisting of: (a) wheat; (b) corn; (c) soybeans; (d) soybean meal; (e) coffee "C"; (f) sugar no. 11 (world); (g) world white sugar; (h) sugar no. 14 (domestic); (i) cocoa; (j) cotton (no. 2); (k) rough rice; (l) feeder cattle; (m) frozen pork bellies; and (n) lean hog;
   wherein the standardized contract size for wheat is 5,000 bushels and the standardized delivery time period for wheat is the months of July, September December, March, May, wherein a Last Trading Day is the business day prior to the 15th calendar day of the contract month and a Last Delivery Day is the seventh business day following the Last Trading Day of the delivery month;
   wherein the standardized contract size for corn is 5,000 bushels and the standardized delivery time period for corn is the months of December, March, May, July, September, wherein a Last Trading Day is the business day prior to the 15th calendar day of the contract month and a Last Delivery Day is the second business day following the Last Trading Day of the delivery month;
   wherein the standardized contract size for soybeans is 5,000 bushels and the standardized delivery time period for soybeans is the months of September, November, January, March, May, July, August, wherein a Last Trading Day is the business day prior to the 15th calendar day of the contract month and a Last Delivery Day is the second business day following the Last Trading Day of the delivery month;
   wherein the standardized contract size for soybean meal is 100 tons and the standardized delivery time period for soybean meal is the months of January, March, May, July, August, September, October, December, wherein a Last Trading Day is the business day prior to the 15th calendar day of the contract month and a Last Delivery Day is the second business day following the Last Trading Day of the delivery month;
   wherein the standardized contract size for coffee "C" is 37,500 pounds and the standardized delivery time period for coffee "C" is the months of March, May, July, September, December, wherein delivery of Coffee "C" may be made on any business day between the first (1st) and last days of the delivery month;
   wherein the standardized contract size for sugar no. 11 (world) is 50 long tons and the standardized delivery time period for sugar no. 11 (world) is the months of January, March, May, July, October, wherein a Receiver shall have the sugar vessel ready at load port on any day from the first (1st) calendar day of the delivery month to and including the fifteenth (15th) calendar day of the second (2nd) succeeding calendar month;

wherein the standardized contract size for world white sugar is 50 metric tons and the standardized delivery time period for world white sugar is the months of March, May, August, October, December, wherein delivery period means the period commencing on and including the first day of the delivery month, up to and including the last day of the succeeding month;

wherein the standardized contract size for sugar no. 14 (domestic) is 50 long tons and the standardized delivery time period for sugar no. 14 (domestic) is the months of January, March, May, July, September, November, wherein delivery under this contract shall be considered timely delivery if the vessel carrying the sugar reports ready to discharge at its first (1st) sugar delivery berth not later than 8:00 A.M. on the last business day of the delivery month;

wherein the standardized contract size for cocoa is 10 metric tons and the standardized delivery time period for cocoa is the months of December, March, May, July, September, wherein delivery of cocoa may be made on any business day between the first (1st) and last days of the delivery month;

wherein the standardized contract size for cotton (no. 2) is 50,000 pounds net weight and the standardized delivery time period for active trading months: March, May, July, October, December, wherein the term First Delivery Day shall mean the first (1st) business day of the expiring month, and the term Last Delivery Day shall mean the seventh (7th) last business day of the expiring month;

wherein the standardized contract size for rough rice is 2,000 hundredweight and the standardized delivery time period for rough rice is the months of September, November, January, March, May, July, wherein the Last Trading Day is the business day prior to the $15^{th}$ calendar day of the delivery month and the Last Delivery Day is the seventh business day following the Last Trading Day of the month;

wherein the standardized contract size for feeder cattle is 50,000 pounds and the standardized delivery time period for feeder cattle is the months of January, March, April, May, August, September, October, November;

wherein the standardized contract size for frozen pork bellies is 40,000 pounds and the standardized delivery time period for frozen pork bellies is the months of February, March, May, July, August; and wherein the standardized contract size for lean hog is 40,000 pounds and the standardized delivery time period for live hog is the months of February, April, June, July, August, October, December.

2. The system of claim 1, wherein the set of program instructions at least partially embodies a registration interface configured to receive input from at least one of the first and second customers reflecting user information, user profile data, a membership list, acceptable user data, acceptable trade data or any combination thereof.

3. The system of claim 2, wherein the input is displayed, indicated or categorized on the commodity exchange interface.

4. The system of claim 2, wherein the input is applied to at least one subsequent trade of at least one of the first and second customers in the form of an applicable rule set.

5. The system of claim 1, wherein at least one of the first and second customers is a trader, a commodity broker, a commodity trader, a freight provider, a futures broker, a producer, an importer, an exporter, a financial services provider, a financial institution, a speculator, a trade house, an association, a processor, a refiner, a buying agency, a hedge fund, a commodity trading advisor, a news agency, a vessel agent, a laboratory testing service, a commodity insurance provider, a government agency, a manufacturer, an entity involved in the commodity market or any combination thereof.

6. The system of claim 1, wherein the commodity exchange interface further comprises:
   (i) a display in at least one of the first and second dynamic trading windows of a plurality of transactions, orders, trades, offers, counteroffers, proposals, counterproposals, bids, counterbids, executed trades or any combination thereof, directed to another marketplace, another type or variation of commodity or any combination thereof;
   (ii) at least one chart window configured to display at least one technical indicator related to a commodity;
   (iii) at least one dynamic data window configured to display a data feed, a technical data feed, a news feed, an external data vendor feed, a scrolling data feed, a scrolling ticker feed, quote data, historical data, real-time data, delayed data or any combination thereof;
   (iv) at least one user input window configured to receive user input data from at least one of the first and second customers; or any combination thereof.

7. The system of claim 1, wherein the commodity exchange interface further comprises a trade activity window configured to display activity of at least one of the first and second customers, market activity, commodity activity, futures market activity, differential data, spread data, arbitrage data, market movement data or any combination thereof.

8. The system of claim 7, wherein the trade activity window is configured to display a differential between each contract's delivery period, a differential between separate contract's delivery period, or any combination thereof.

9. The system of claim 1, wherein the set of program instructions is further configured to:
   (i) receive input from at least one of the first and second customers at the commodity exchange interface;
   (ii) permit interaction by at least one of the first and second customers with the commodity exchange interface;
   (iii) permit manipulation by at least one of the first and second customers of at least a portion of the commodity exchange interface;
   (iv) permit selection by at least one of the first and second customers of at least a portion of the commodity exchange interface;
   (v) permit expansion by at least one of the first and second customers of at least a portion of the commodity exchange interface;
   (vi) display a menu having at least one selectable item on the commodity exchange interface; or any combination thereof.

10. A computer-implemented system for commodity exchange, comprising:
    i) a commodity exchange interface configured to display data substantially simultaneously to at least a first customer and a second customer, wherein each of the first and second customers is an end-to-end market player;
    ii) the commodity exchange interface including at least a first real-time, dynamic trading window associated with the first customer and a second real-time, dynamic trading window associated with the second customer, wherein each of the first and second real-time, dynamic trading windows is configured to display for a specific physical commodity at least the following:
  a) a negotiable quantity of the physical commodity, wherein the negotiable quantity is an amount of the physical commodity that is tradeable on a domestic, regional or international market and wherein the negotiable quantity is negotiable in amounts that are not limited to a standardized contract size;
  b) a negotiable shipment period for the physical commodity, wherein the negotiable shipment period specifies at least the time period at which the physical commodity is available for pick up or delivery and wherein the negotiable shipment period is negotiable in amounts that are not limited to a standardized delivery time period;
  c) a negotiable quality for the physical commodity;
 iii) the commodity exchange interface including a system to allow for direct negotiations prior to contract formation between the first and second customers for at least the negotiable quantity, negotiable shipment period and negotiable quality; and
 iv) a set of program instructions configured to process at least one commodity trade made directly between the first and second customers, the commodity trade being updated in at least the first real-time, dynamic trading window associated with the first customer and the second real-time, dynamic trading window associated with the second customer.

11. The system of claim 10, wherein the set of program instructions at least partially embodies a registration interface configured to receive input from at least one of the first and second customers reflecting user information, user profile data, a membership list, acceptable user data, acceptable trade data or any combination thereof.

12. The system of claim 11, wherein the input is displayed, indicated or categorized on the commodity exchange interface.

13. The system of claim 11, wherein the input is applied to at least one subsequent trade of at least one of the first and second customers in the form of an applicable rule set.

14. The system of claim 10, wherein at least one of the first and second customers is a trader, a commodity broker, a commodity trader, a freight provider, a futures broker, a producer, an importer, an exporter, a financial services provider, a financial institution, a speculator, a trade house, an association, a processor, a refiner, a buying agency, a hedge fund, a commodity trading advisor, a news agency, a vessel agent, a laboratory testing service, a commodity insurance provider, a government agency, a manufacturer, an entity involved in the commodity market or any combination thereof.

15. The system of claim 10, wherein the commodity exchange interface further comprises:
  (i) a display in at least one of the first and second dynamic trading windows of a plurality of transactions, orders, trades, offers, counteroffers, proposals, counterproposals, bids, counterbids, executed trades or any combination thereof, directed to another marketplace, another type or variation of commodity or any combination thereof;
  (ii) at least one chart window configured to display at least one technical indicator related to a commodity;
  (iii) at least one dynamic data window configured to display a data feed, a technical data feed, a news feed, an external data vendor feed, a scrolling data feed, a scrolling ticker feed, quote data, historical data, real-time data, delayed data or any combination thereof;
  (iv) at least one user input window configured to receive user input data from at least one of the first and second customers; or any combination thereof.

16. The system of claim 10, wherein the commodity exchange interface further comprises a trade activity window configured to display activity of at least one of the first and second customers, market activity, commodity activity, futures market activity, differential data, spread data, arbitrage data, market movement data or any combination thereof.

17. The system of claim 16, wherein the trade activity window is configured to display a differential between each contract's delivery period, a differential between separate contract's delivery period, or any combination thereof.

18. The system of claim 10, wherein the set of program instructions is further configured to:
  (i) receive input from at least one of the first and second customers at the commodity exchange interface;
  (ii) permit interaction by at least one of the first and second customers with the commodity exchange interface;
  (iii) permit manipulation by at least one of the first and second customers of at least a portion of the commodity exchange interface;
  (iv) permit selection by at least one of the first and second customers of at least a portion of the commodity exchange interface;
  (v) permit expansion by at least one of the first and second customers of at least a portion of the commodity exchange interface;
  (vi) display a menu having at least one selectable item on the commodity exchange interface; or any combination thereof.

* * * * *